(12) United States Patent
Liu et al.

(10) Patent No.: US 12,531,997 B2
(45) Date of Patent: Jan. 20, 2026

(54) PREDICTION OF RATE DISTORTION CURVES FOR VIDEO ENCODING

(71) Applicant: Beijing YoJaJa Software Technology Development Co., Ltd., Beijing (CN)

(72) Inventors: Chen Liu, Beijing (CN); Wenhao Zhang, Beijing (CN); Xuchang Huangfu, Beijing (CN); Xiaobo Liu, Beijing (CN); Xuewei Meng, Beijing (CN)

(73) Assignee: Beijing YoJaJa Software Technology Development Co., Ltd., Beijing (CN)

(*) Notice: Subject to any disclaimer, the term of this patent is extended or adjusted under 35 U.S.C. 154(b) by 17 days.

(21) Appl. No.: 18/295,184

(22) Filed: Apr. 3, 2023

(65) Prior Publication Data

US 2024/0305788 A1 Sep. 12, 2024

Related U.S. Application Data

(63) Continuation-in-part of application No. 18/179,281, filed on Mar. 6, 2023, now Pat. No. 12,225,252.

(51) Int. Cl.
*H04N 19/146* (2014.01)
*H04N 19/11* (2014.01)
(Continued)

(52) U.S. Cl.
CPC .......... *H04N 19/146* (2014.11); *H04N 19/11* (2014.11); *H04N 19/172* (2014.11); *H04N 19/59* (2014.11)

(58) Field of Classification Search
CPC ...... H04N 19/11; H04N 19/59; H04N 19/146; H04N 19/172
See application file for complete search history.

(56) References Cited

U.S. PATENT DOCUMENTS 11,190,826 B1 11/2021 Labrozzi et al.
11,277,620 B1 3/2022 Liu et al.
(Continued)

FOREIGN PATENT DOCUMENTS

CN 111277826 A 6/2020
CN 115349263 A 11/2022
(Continued)

OTHER PUBLICATIONS

Extended European Search Report for European Application No. 24156321.2, dated Jul. 22, 2024, 11 pgs.
(Continued)

*Primary Examiner* — Dave Czekaj
*Assistant Examiner* — Shanika M Brumfield
(74) *Attorney, Agent, or Firm* — Kwan & Olynick LLP

(57) ABSTRACT

In some embodiments, a method determines feature values for a portion of a video and a target configuration. The target configuration is associated with a parameter of an encoder and includes a set of bitrates and a resolution. A plurality of quality values is generated for the set of bitrates and the resolution based on the feature values. The method generates a representation of a relationship between bitrate and the plurality of quality values for the resolution. The representation is analyzed to determine a list of bitrates for the portion of the video. The method outputs he list of bitrates for use encoding the portion of the video using the resolution.

20 Claims, 32 Drawing Sheets

(51) Int. Cl.
*H04N 19/172* (2014.01)
*H04N 19/59* (2014.01)

(56) References Cited

U.S. PATENT DOCUMENTS

| | | | |
|---|---|---|---|
| 11,729,438 B1 | 8/2023 | Jain et al. | |
| 2009/0141992 A1* | 6/2009 | Coulombe | H04N 19/40 382/238 |
| 2010/0150459 A1* | 6/2010 | Coulombe | H04N 19/15 382/232 |
| 2013/0293725 A1* | 11/2013 | Zhang | H04N 17/02 348/180 |
| 2016/0014418 A1* | 1/2016 | Shao | H04N 19/174 375/240.02 |
| 2016/0295216 A1 | 10/2016 | Aaron et al. | |
| 2017/0359580 A1* | 12/2017 | Su | H04N 19/179 |
| 2018/0124146 A1 | 5/2018 | Chen et al. | |
| 2019/0020871 A1* | 1/2019 | Xu | H04N 19/197 |
| 2019/0297329 A1* | 9/2019 | Bampis | H04N 19/154 |
| 2020/0296362 A1* | 9/2020 | Chadwick | G06V 10/454 |
| 2021/0150393 A1* | 5/2021 | Johansson | H04L 65/80 |
| 2021/0360260 A1 | 11/2021 | Rehman et al. | |
| 2022/0030247 A1* | 1/2022 | Olekas | H04N 19/154 |
| 2022/0046305 A1 | 2/2022 | Labrozzi et al. | |
| 2023/0104270 A1 | 4/2023 | Wang et al. | |
| 2023/0188764 A1 | 6/2023 | Pahalawatta et al. | |
| 2024/0107027 A1 | 3/2024 | Yamagishi et al. | |
| 2024/0119575 A1* | 4/2024 | Bampis | G06T 7/0002 |
| 2024/0121400 A1* | 4/2024 | Menon | H04N 19/115 |

FOREIGN PATENT DOCUMENTS

| | | | | |
|---|---|---|---|---|
| EP | 4429235 A1 | 9/2024 | | |
| EP | 4429236 A1 | 9/2024 | | |
| JP | 2018513604 A | 5/2018 | | |
| JP | 2023524000 A | 6/2023 | | |
| WO | 2016160295 A1 | 10/2016 | | |
| WO | WO-2021113181 A1 * | 6/2021 | | H04N 19/124 |
| WO | 2021236059 A1 | 11/2021 | | |
| WO | 2022185534 A1 | 9/2022 | | |

OTHER PUBLICATIONS

Somdyuti Paul et al: "Efficient Per-Shot, Convex Hull Prediction By Recurrent Learning", Arxiv.org, Cornell University Library, 201 Olin Library Cornell University Ithaca, NY 14853, Jun. 10, 2022 (Jun. 10, 2022), XP091244097, 11 pgs.

Zabrovskiy Anatoliy et al: "FAUST: Fast Per-scene Encoding using Entropy-Based scene Detection and Machine Learning", 2021 30th Conference of Open Innovations Association Fruct, Fruct, Oct. 27, 2021 (Oct. 27, 2021), pp. 292-302, XP034024326, DOI: 10.23919/FRUCT53335.2021.9599963, 11 pgs.

Zhengfang Duanmu et al: "Modeling Generalized Rate-Distortion Functions", Arxiv.org, Cornell University Library, 201 Olin Library Cornell University Ithaca, NY 14853, Jun. 12, 2019 (Jun. 12, 2019}, XP081376508, 17 pgs.

Liu, et al., "Dynamic Selection of Candidate Bitrates for Video Encoding," U.S. Appl. No. 18/179,281, filed Mar. 6, 2023, 59 pages.

Liu, et al., "Encoding Operational Points Selection for Video Encoding," U.S. Appl. No. 18/435,842, filed Feb. 7, 2024, 71 pages.

De Cock Jan et al: "Complexity-based consistent-quality encoding in the cloud", 2016 IEEE International Conference on Image Processing (ICIP), IEEE, Sep. 25, 2016 (Sep. 25, 2016), pp. 1484-1488, XP033016722, DOI: 10.1109/ICIP.2016.7532605 [retrieved on Aug. 3, 2016].

Extended European Search Report for Application No. 24156318.8, dated Jun. 14, 2024, 11 pgs.

Zabrovskiy Anatoliy et al: "FAUST" Fast Per-Scene Encoding Using Entropy-Based Scene Detection and Machine Learning:, 2021 30th Conference of Open Innovations Associateion Fruct, Fruct, Oct. 27, 2021 (Oct. 27, 2021), pp. 292-302, XP034024326, DOI: 10.23919/FRUCT53335.2021.9599963 [retrieved on Nov. 2, 2021].

Office Action, Japanese Patent Application No. 2023-199246, mailed Jan. 21, 2025, 5 pages.

Extended European Search Report, EP Application No. 24217423.3, Feb. 20, 2025, 8 pages.

Decision of Rejection, Japanese Patent Application No. 2023-199277, mailed May 20, 2025, 7 pages.

Foreign Office Action, JP Patent Application No. 2023-199277, mailed Dec. 3, 2024.

* cited by examiner

PREDICTION OF RATE DISTORTION CURVES FOR VIDEO ENCODING

CROSS REFERENCE TO RELATED APPLICATIONS

This application is a continuation-in-part application and, pursuant to 35 U.S.C. § 120, is entitled to and claims the benefit of earlier filed application U.S. application Ser. No. 18/179,281, filed Mar. 6, 2023, entitled "DYNAMIC SELECTION OF CANDIDATE BITRATES FOR VIDEO ENCODING", the content of which is incorporated herein by reference in its entirety for all purposes.

BACKGROUND

One method of delivering videos to client devices uses Adaptive Bitrate Streaming (ABR). Adaptive bitrate streaming is predicated on providing multiple streams (often referred to as variants or profiles) that are encoded at different levels of video attributes, such as different levels of bitrate and/or quality. A profile ladder lists different profiles that are available for a client to use when streaming segments of a video. Clients can dynamically select profiles based on network conditions and other factors. The video is segmented (e.g., split into discrete segments, usually a few seconds long each), and clients can switch from one profile to another at segment boundaries as network conditions change. For example, a video delivery system would like to provide clients with a profile that has a higher bitrate when network conditions with higher available bandwidth are being experienced, which improves the quality of the video being streamed. When network conditions with lower available bandwidth are being experienced, the video delivery system would like to provide clients with a profile with a lower bitrate such that the clients can play the video without any playback issues, such as rebuffering or downloading failures.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
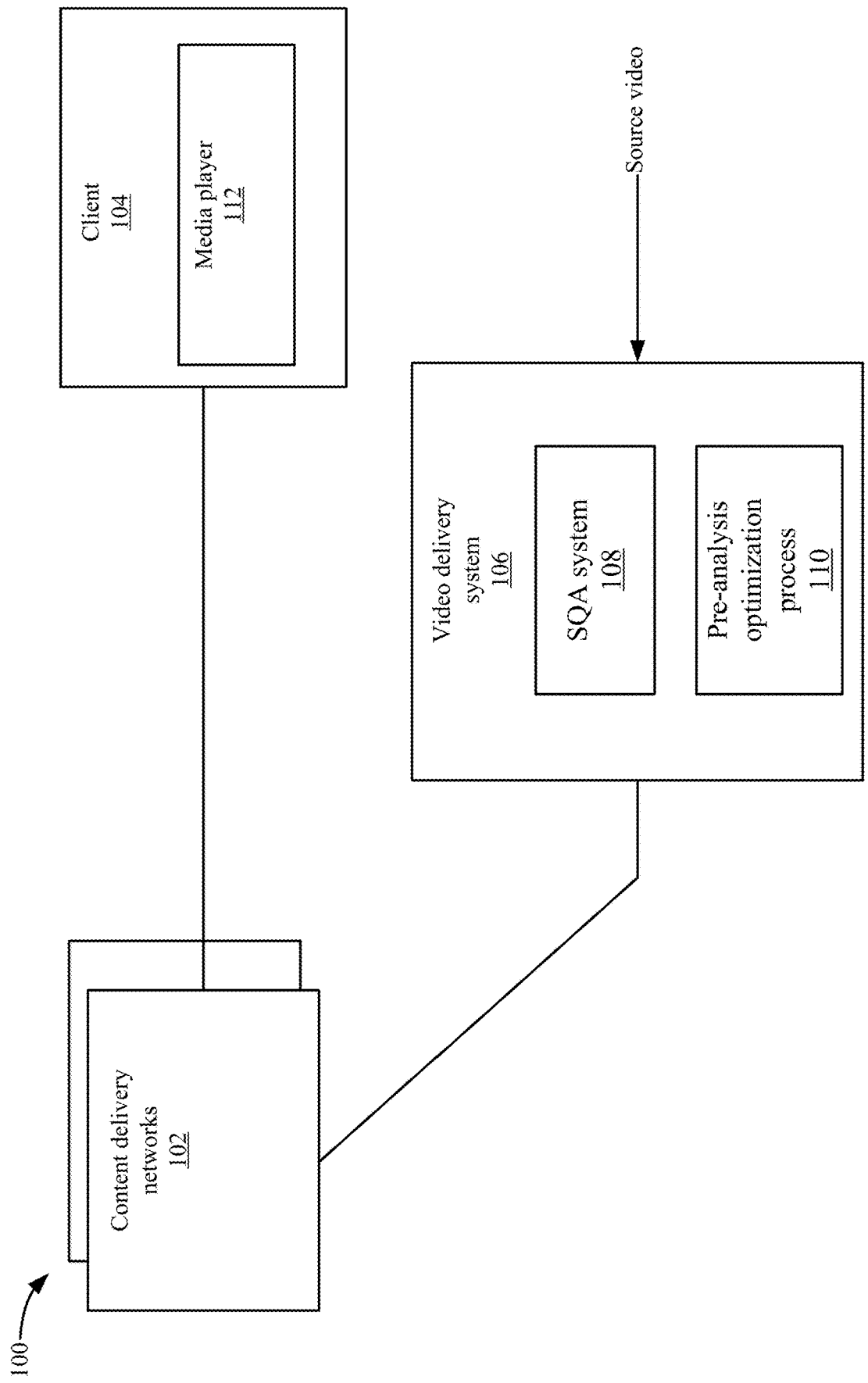
FIG. 1 depicts a system for dynamically selecting a list of candidate average bitrates according to some embodiments.

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

A system may adaptively generate a list of bitrates that is used for encoding a video. The list of bitrates may be referred to as candidate average bitrates (CABs). An encoder transcodes segments of the video using the respective bitrates in the list of candidate average bitrates. In some embodiments, the system may dynamically select a list of candidate average bitrates for different portions of the video, such as for different chunks of the video. A chunk may be an independent encoding unit that an encoder encodes with the same settings. A video may include one or more chunks, and each chunk may include multiple segments. In some embodiments, the list of candidate average bitrates may be set at the chunk level. Although the list of candidate average bitrates is discussed as being set at the chunk level, the list of candidate average bitrates may be set for different portions of the video.

The encoder may encode segments of the video using the bitrates in the list of candidate average bitrates to generate multiple candidate segments. A segment quality-driven adaptive (SQA) process may select segments from the candidate segments to use for profiles in a profile ladder. A target of the process is to optimize (e.g., minimize) the storage or delivery footprint of portions of the video while maintaining a similar quality.

Each video may have different characteristics. Similarly, different portions within the same video may also have different characteristics. Using a static list of candidate average bitrates for all the portions of a video or for multiple videos may not provide optimal results. For example, a static list of candidate average bitrates may encode a video with simple video content with more bitrate than is needed. Also, a video with complex video content may be encoded with poor quality due to insufficient bitrate. Additionally, the static list of candidate average bitrates may generate segments with irregular quality gaps from an encoding perspective. For example, adjacent profiles may have similar video quality that are redundant to each other or may have unacceptable large quality gaps. Having similar video quality for adjacent profiles may be unnecessary and not provide many advantages in viewing quality. For example, if two bitrates in the list of candidate average bitrates result in encoded segments that have similar qualities, then transcoding the segment with those two bitrates may be redundant, and may waste resources. Also, having a large quality gap may result in an adverse viewing experience during playback as the quality may change drastically when playback switches from one profile to another profile.

To overcome the above disadvantages, a pre-analysis optimization process may dynamically select bitrates in the list of candidate average bitrates for a video. To select the list of candidate average bitrates, the pre-analysis optimization process may analyze a portion of video and output an optimized list of candidate average bitrates for that portion. For example, the pre-analysis optimization process may analyze characteristics of each portion and output a list of candidate average bitrates for each portion. In some embodiments, the pre-analysis optimization process may predict characteristics of the portion, such as a rate distortion curve that describes the quality versus the bitrate for the portion. The pre-analysis optimization process uses the respective rate distortion curve to determine the optimal list of bitrates for each portion.

The optimization process provides many advantages. For example, the process provides an optimal selection of transcoded segments to select from when selecting segments for profiles in the profile ladder. If the list of candidate average bitrates is set with static values for the entire video and/or is the same for multiple different videos, suboptimal transcoding may result. Different videos and also different portions of the same video may have diverse characteristics. Therefore, a static list of candidate average bitrates may be suboptimal for some videos or portions of a video. The use of a dynamic list of candidate average bitrates that is based on characteristics of portions of video may result in a higher quality video and viewing experience because the segment quality-driven adaptive process may have a better selection of encoded segments to select from to form the profiles for the profile ladder.

System

FIG. 1 depicts a system 100 for dynamically selecting a list of candidate average bitrates according to some embodiments. System 100 includes content delivery networks 102, clients 104, and a video delivery system 106. Source files may include different types of content, such as video, audio, or other types of content information. Video may be used for discussion purposes, but other types of content may be appreciated. In some embodiments, a source file may be received in a format that requires encoding to another format, which will be discussed below. For example, the source file may be a mezzanine file that includes compressed video. The mezzanine file may be encoded to create other files, such as different profiles of the video.

A content provider may operate video delivery system 106 to provide a content delivery service that allows entities to request and receive media content. The content provider may use video delivery system 106 to coordinate the distribution of media content to a client 104. Although a single client 104 is discussed, multiple clients 104 may be using the service. The media content may be different types of content, such as on-demand videos from a library of videos and live videos. In some embodiments, live videos may be where a video is available based on the linear schedule. Videos may also be offered on-demand. On-demand videos may be content that can be requested at any time and not limited to viewing on a linear schedule. The videos may be programs, such as movies, shows, advertisements, etc.

Client 104 may include different computing devices, such as smartphones, living room devices, televisions, set top boxes, tablet devices, etc. Client 104 includes a media player 112 that can play content, such as a video. In some embodiments, media player 112 receives segments of video and can play these segments. Client 104 may send requests for segments to one of content delivery networks 102, and then receive the requested segments for playback in media player 112. The segments may be a portion of the video, such as six seconds of the video.

A video may be encoded in a profile ladder that includes multiple profiles. Each profile may correspond to different configurations, which may be different levels of bitrates and/or quality, but may also include other characteristics, such as codec type, computing resource type (e.g., computer processing unit), etc. Each video may have associated profiles that have different configurations. The profiles may be classified at different levels and each level may be associated with a different configuration. For example, a level may be combination of bitrate, resolution, codec, etc. For example, each level may be associated with a different bitrate, such as 400 kilobytes per second (kbps), 650 kbps, 1000 kbps, 1500 kbps . . . 12000 kbps. Also, each level may be associated with another characteristic, such as a quality characteristic (e.g., resolution). The profile levels may be referred to as higher or lower, such as profiles that have higher bitrates or quality may be rated higher than profiles with lower bitrates or quality. An encoder may use the characteristics to encode the source video. For example, the encoder may encode the source video with a target bitrate of 1500 kbps.

Content delivery networks 102 include servers that can deliver a video to client 104. Content delivery networks 102 receive requests for segments of video from client 104, and delivers segments of video to client 104. Client 104 may request a segment of video from one of the profile levels based on current playback conditions. The playback conditions may be any conditions that are experienced based on the playback of a video, such as available bandwidth, buffer length, etc. For example, client 104 may use an adaptive bitrate algorithm to select the profile for the video based on the current available bandwidth, buffer length, or other playback conditions. Client 104 may continuously evaluate the current playback conditions and switch among the profiles during playback of segments of the video. For example, during the playback, media player 112 may request different profiles of the video asset. For example, if low bandwidth playback conditions are being experienced, then media player 112 may request a lower profile that is associated with a lower bitrate for an upcoming segment of the video. However, if playback conditions of a higher available bandwidth are being experienced, media player 112 may request a higher-level profile that is associated with a higher bandwidth for an upcoming segment of the video.

A segment quality driven adaptive processing system (SQA system) 108 may encode segments using a list of candidate average bitrates. Then, SQA system 108 selects segments for each profile using an optimization process. For example, SQA system 108 may adaptively select a segment with an optimal bitrate for each profile of the profile ladder while maintaining similar quality levels. SQA system 108 allows the system to maintain similar or matching quality to the target bitrate while minimizing the number of bits required to store or deliver the content.

A pre-analysis optimization process 110 may dynamically generate a list of candidate average bitrates for portions of a video. In some embodiments, pre-analysis optimization process 110 may predict respective characteristics of a portion of video, such as a rate distortion curve. Then, pre-analysis optimization process 110 selects candidate average bitrates for the portion based on analyzing the respective characteristics of the portion of video.

The following will now describe the segment quality driven adaptive processing process and then the dynamic selection of the list of candidate average bitrates in more detail.

Segment Quality Driven Adaptive Process

Figure 2:
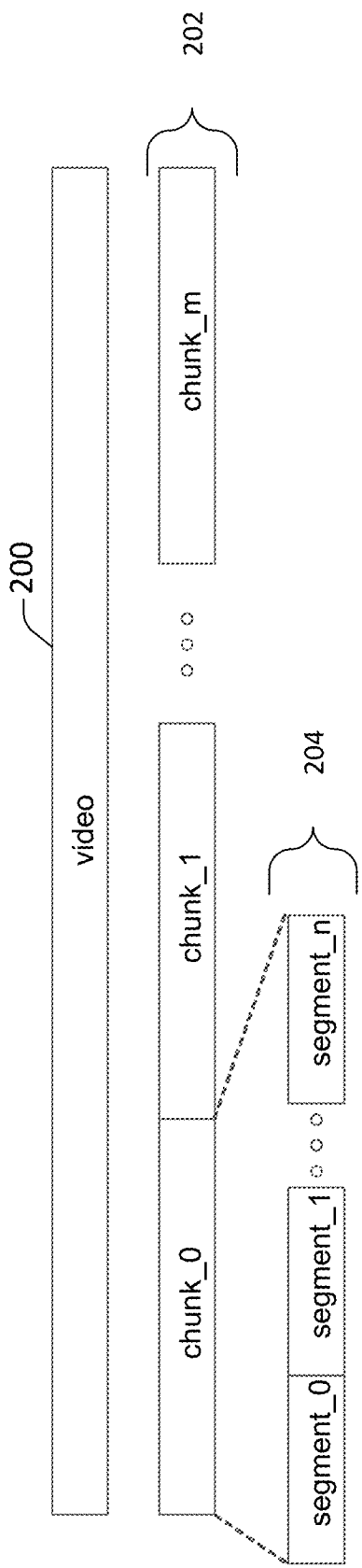
FIG. 2 shows an example of portions of a video according to some embodiments.

As discussed above, optimization process 110 may dynamically select a list of candidate average bitrates for portions of a video. The portion of video may be different sizes. FIG. 2 shows an example of portions of a video according to some embodiments. A video 200 may be divided into different portions at a segment level and a chunk level. In some embodiments, at 202, video 200 may be divided into chunk level portions. For example, multiple chunks of chunk_0, chunk_1, . . . , chunk_m may be included in video 200. Each respective chunk may be divided into smaller portions, which may be referred to as segments. For example, at 204, chunk_0 is divided into segments of segment_0, segment_1, . . . , segment_n. Similarly, although not shown, chunk_1 may be divided into its own respective segments of segment_0, segment_1, . . . , segment_n. The segments may be shorter in length than the chunks. For example, a chunk may be two minutes of video and a segment may be five seconds of video.

In the segment quality driven adaptive process, SQA system 108 may process each segment of video 200 to generate multiple encodings of each respective segment based on a list of candidate average bitrates. For discussion purposes, optimization process 110 selects a list of candidate average bitrates per chunk; however, the list of candidate average bitrates may be selected for different portion sizes, such as per segment, for multiple chunks, etc. The bitrates included in each respective list of candidate average bitrates may be optimized based on characteristics associated with the respective portion of video that will use the list of candidate average bitrates (e.g., a chunk and/or segments). Given different characteristics for different chunks, respective lists of candidate average bitrates may be different. However, it may be possible that bitrates for multiple chunks in respective lists of candidate average bitrates are the same.

Figure 3A:
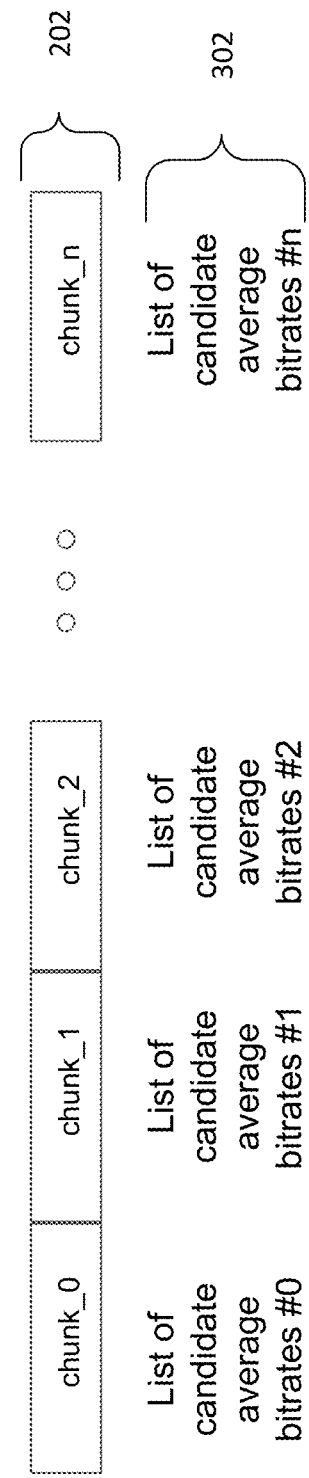
FIG. 3A depicts an example of the generation of lists of candidate average bitrates according to some embodiments.

FIG. 3A depicts an example of the generation of lists of candidate average bitrates according to some embodiments. At 202, chunks are shown of chunk_0, chunk_1, chunk_2, . . . , chunk_n. At 302, optimization system 110 has selected a list of candidate average bitrates for each chunk based on characteristics of each respective chunk. For example, for chunk_0, a list of candidate average bitrates #0 is based on the characteristics for chunk_0. Also, a list of candidate average bitrates #1 is based on the characteristics for chunk_1, and so on. In some examples, for chunk_0, the list of candidate average bitrates #0 may include the bitrates of 8500, 7750, 7000, 6250, 5500, 4750, 4000, 3250 Kilobytes per second (Kbps). For chunk_1, the list of candidate average bitrates #1 may include the bitrates of 7000, 6250, 4750, 4000, 3250, 2000, 1250 Kbps.

The list of candidate average bitrates may include bitrates that are used by an encoder to encode a respective segment. Conventionally, the candidate average bitrates may have statically included the same bitrates. Sometimes, two types of bitrates were used for all chunks. A first type may be a target average bitrate and a second type may be an intermediate average bitrate. The target average bitrate may be a basic bitrate that is associated with profiles in a profile ladder for adaptive bitrate encoding. An intermediate average bitrate may be a supplement to the target average bitrate. For example, additional bitrates in between target average bitrates may be added. The use of intermediate average bitrates may provide additional bitrates to encode additional encoded segments that may have different characteristics than the encoded segments from the target average bitrates, such as quality. In some cases, optimization process 110 may include bitrates from the target average bitrate and/or the intermediate average bitrates in the list of candidate average bitrates. For example, optimization process 110 may include the target average bitrates in the list of candidate average bitrates, but dynamically select other bitrates. In other examples, optimization process may dynamically select the bitrates in the list of candidate average bitrates based solely on the characteristics of the chunk.

Figure 3B:
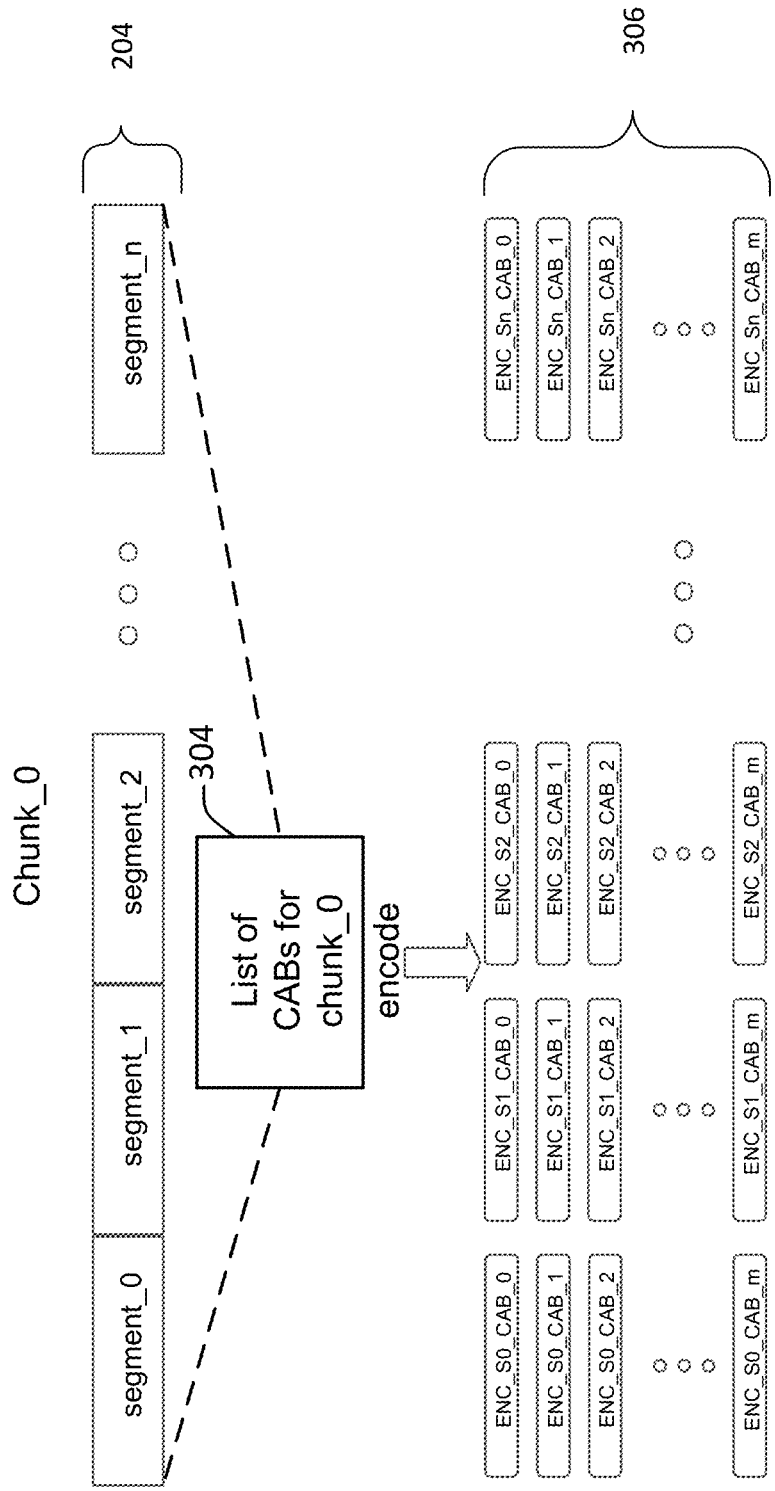
FIG. 3B depicts an example of the generation of encoded segments according to some embodiments.

As discussed above, an encoder generates encoded segments for a chunk. FIG. 3B depicts an example of the generation of encoded segments according to some embodiments. At 204, segments for a chunk of chunk_0 are shown of segment_0, segment_1, segment_2, . . . , segment_n. At

304, a list of candidate average bitrates (list of CABs) for chunk_0 is used. In some embodiments, the same list of candidate average bitrates for chunk_0 is used for all segments of the chunk. However, multiple different lists of candidate average bitrates could be used for different segments of the chunk. Then, an encoder encodes the segments of chunk_0 using the list of candidate average bitrates.

At 306, encoded segments for each respective segment are listed. For a respective segment, an encoder encodes the segment using the average bitrates in the list of candidate average bitrates. The encoder may target the respective average bitrate when encoding the segment. This results in a set of encoded segments for each segment of the chunk, such as encoded segments for segment_0 of ENC_S0_CAB_0, ENC_S0_CAB_1, ENC_S0_CAB_2, . . . , ENC_S0_CAB_n. In the notation, ENC_S0 represents the encoded segment of segment_0, and CAB_0, CAB_1, CAB_2, etc. represents the candidate average bitrates. For example, CAB_0 may be 8500 Kbps, CAB_1 may be 7750 Kbps, and CAB_2 may be 7000 Kbps. Each encoded segment may be encoded at the same quality level, such as 1080p. The process may be repeated for another quality level using the list of candidate average bitrates.

Figure 4:
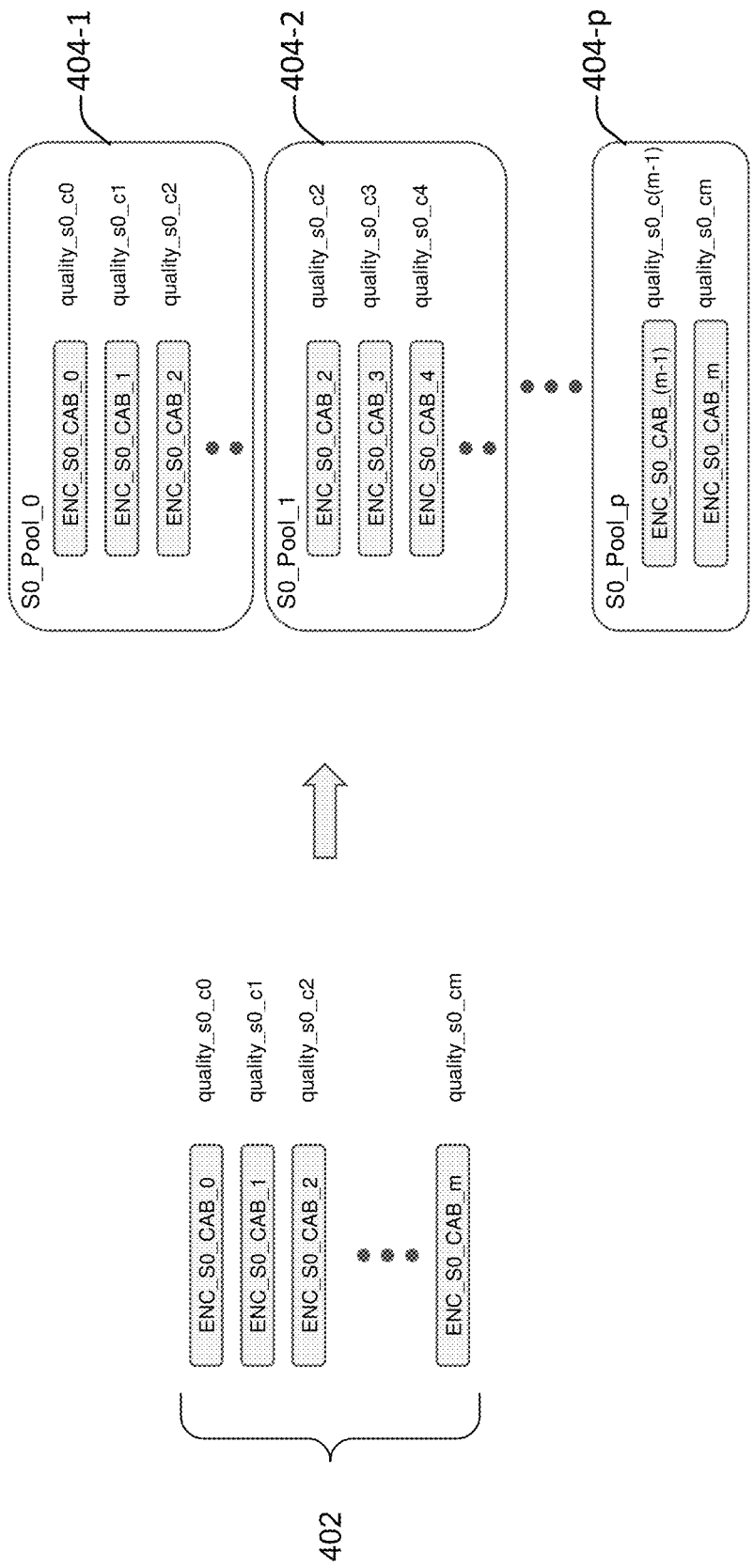
FIG. 4 depicts an example of clustering encoded segments into multiple pools according to some embodiments.

For each segment, optimization process 110 clusters the encoded segments into multiple pools. Each pool may correspond to one profile. FIG. 4 depicts an example of clustering encoded segments into multiple pools according to some embodiments. At 402, multiple encoded segments are shown for the candidate average bitrates. Each segment may have an associated value for a quality metric. For example, encoded segment ENC_S0_CAB_0 may have a quality of quality_S0_c0 and encoded segment ENC_S0_CAB_1 may have a quality of quality_S0_c1, etc. In the notation, quality_S0 represents the encoded segment of segment_0, and c0, c1, c2, etc. represents the quality for this encoded segment.

Different methods may be used to include encoded segments in pools 401-1, 404-2. 404-$p$. For example, each pool may have or may be associated with a profile. A respective profile may be associated with a target bitrate, which may be the maximum bitrate that can be used to encode a segment in the associated profile. SQA system 108 may include encoded segments starting with the highest average bitrate that can be used for the associated profile for the pool. Then, SQA system 108 may add other encoded segments at other bitrates that are less than the maximum bitrate. This may result in different encoded segments that are included in respective pools. For example, pool S0_Pool_0 may include segments ENC_S0_CAB_0, ENC_S0_CAB_1, ENC_S0_CAB_2, etc. Also, pool S0_Pool_1 may include encoded segments ENC_S0_CAB_2. ENC_S0_CAB_3, ENC_S0_CAB_4, etc. Accordingly, pool S0_Pool_1 may include an encoded segment starting at a bitrate that is less than the maximum bitrate in pool S0_pool_0. If the encoded segments are encoded at the bitrates of 8500, 7750, 7000, 6250, 5500, 4750, 4000, 3250 Kbps, pool S0_pool_0 may start with the encoded segments at the average bitrates of 8500, 7750, 7000, etc., and pool S0_pool_1 may start with the encoded segments at the average bitrates of 7000, 6250, 5500, etc. In some examples, the example bitrates for the pools may be pool_0: 8500, 7700, 7000, 6250, 5500, 4750, pool_1: 7000, 6250, 5500, 4750, 4000, and pool_p: 5500, 4750, 4000, 3250.

Figure 5:
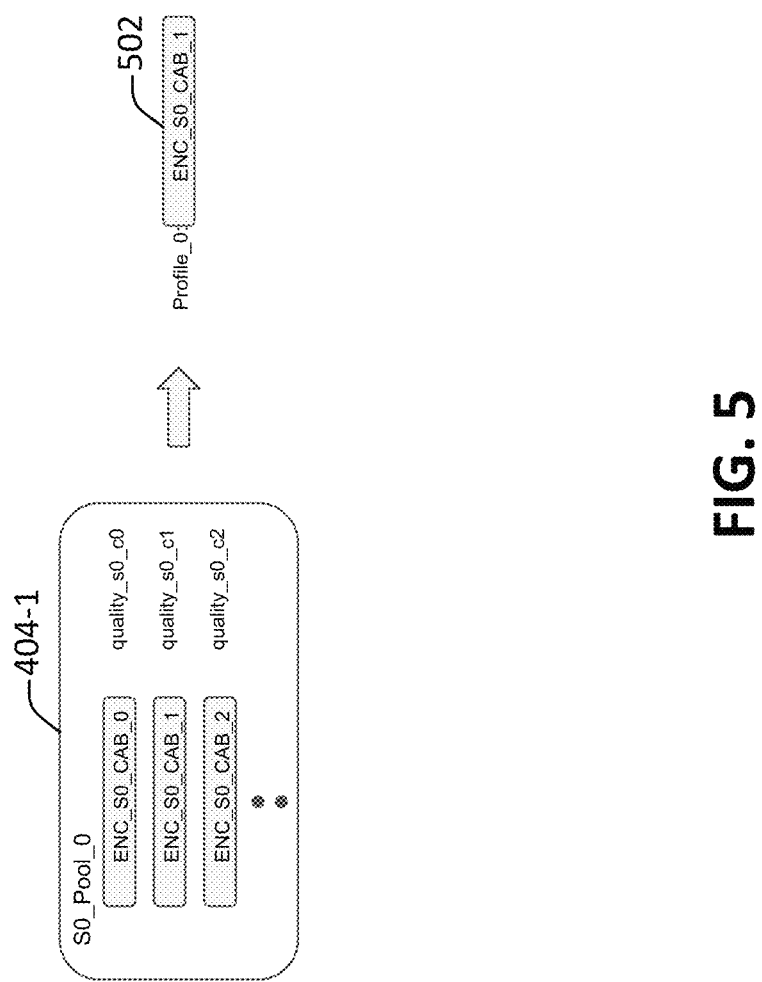
FIG. 5 depicts an example of the selection process according to some embodiments.

From each pool, SQA system 108 may select one encoded segment based on using a selection process. FIG. 5 depicts an example of the selection process according to some embodiments. The following process may be performed for each pool. At 404-1, pool S0_pool_0 from FIG. 4 is shown with its respective encoded segments. SQA system 108 may use one or more rules to select an encoded segment for each respective pool. At 502, SQA system 108 selects encoded segment ENC_S0_CAB_1 for pool S0_pool_0. In some embodiments, SQA system 108 may attempt to select an encoded segment with a minimum bitrate that has a quality value that meets a criterion. In some examples, SQA system 108 may start from the first encoded segment in the pool, such as the segment with the highest bitrate. Then, SQA system 108 selects an adjacent encoded segment in the pool, such as the encoded segment with the next highest bitrate. If the first encoded segment and the second encoded segment have a similar quality (e.g., within a threshold), SQA system 108 selects the encoded segment with the lowest bitrate. SQA system 108 may continue the comparison using the second encoded segment and an adjacent encoded segment in the pool, such as a third encoded segment. The process may end when an adjacent encoded segment does not have a similar quality. Other methods may also be used, such as starting from the encoded segment with the lowest bitrate. Also, the process may select a segment with a lowest bitrate that has a quality within a threshold of another segment, such as a segment with the highest bitrate. The following will describe an example of the process using a rate distortion curve.

Figure 6:
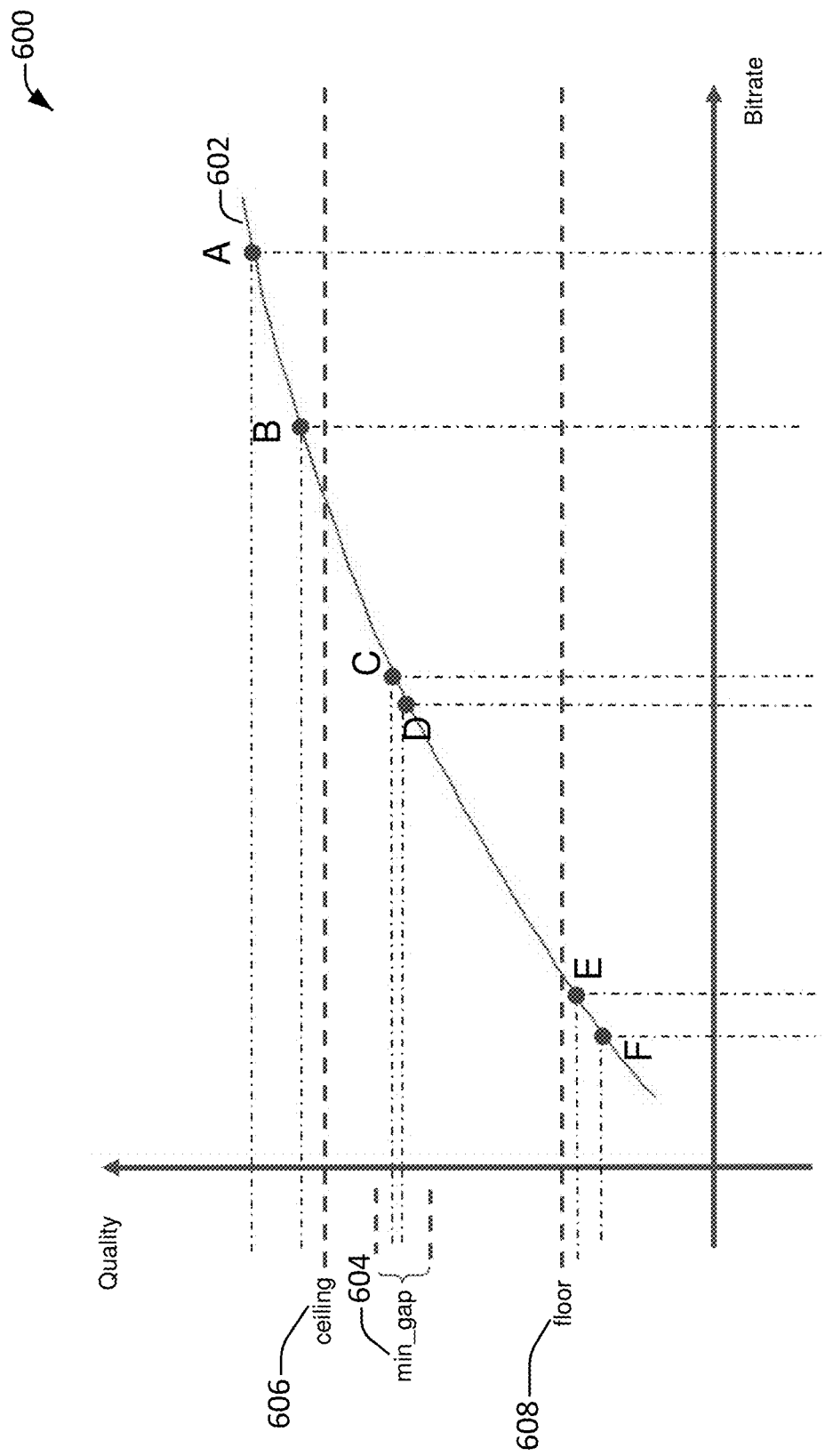
FIG. 6 depicts an example of a graph of a rate distortion curve that may be used to select encoded segments for pools according to some embodiments.

FIG. 6 depicts an example of a graph 600 of a rate distortion curve that may be used to select encoded segments for pools according to some embodiments. In graph 600, the Y-axis is quality and the X-axis is bitrate. A curve 602 defines the relationship between quality and bitrate. For example, the curve may plot rate and distortion of the segment or chunk, but the curve may plot other characteristics of quality and bitrate.

The encoded segments may be listed as A, B, C, D, E, F on the curve 602 based on the respective rate and distortion of the encoded segments. At 604, an example of encoded segments that have similar quality is shown. In this case, encoded segment C and encoded segment D have similar bitrates and similar quality. For example, the quality difference between encoded segment C and encoded segment D may meet a threshold min_gap (e.g., be equal to and/or less than). In this case, since the quality difference is minimal, SQA system 108 may select encoded segment D because this encoded segment has a lower bitrate compared to encoded segment C, but segment D offers a similar quality compared to segment C.

SQA system 108 may also collapse encoded segments whose quality are beyond the ceiling boundary. For example, a ceiling boundary at 606 may be a boundary that is used to determine encoded segments as candidates to collapse. In this case, SQA system 108 may select one or more of the segments above the ceiling threshold, such selecting only one segment (e.g., segment B), or selecting less of the segments found above the ceiling threshold (e.g., selecting two of four segments). In other examples, encoded segments A and B may be removed. Also, SQA system 108 may remove encoded segments whose quality is below a floor boundary. For example, at 608, a floor threshold is shown. SQA system 108 may select one or more of the segments below the floor threshold, such selecting only one segment (e.g., segment F), or selecting less of the segments found below the floor threshold. In other examples, encoded segments E and F may be removed. The ceiling threshold and the floor threshold may be used to limit the segments for a profile that exceed a desired bitrate or quality, or are lower than a desired bitrate or quality. One reason a ceiling is used is to limit the bitrate that is used to encode a segment and one reason a floor is used is to limit bitrates that are used that are too low. After processing of the encoded segments to remove encoded segments, SQA system 108 may select a segment for the profile. For example, SQA system 108 may select the encoded segment with the lowest bitrate that has a quality level that meets a threshold, such as withing a gap to the highest quality segment. In this case, SQA system 108 may select encoded segment D.

Although the above rules may be used to select segments, other processes may be used. For example, the selection of an encoded segment may be based on which encoded segments have been selected for other profiles. In some examples, the segment that is selected may be based on reducing the storage of encoded segments where profiles may reuse segments from other profiles. Accordingly, SQA system 108 may optimize the quality and minimize the bitrate used for encoded segments that are found in between the floor and ceiling.

Figure 7:
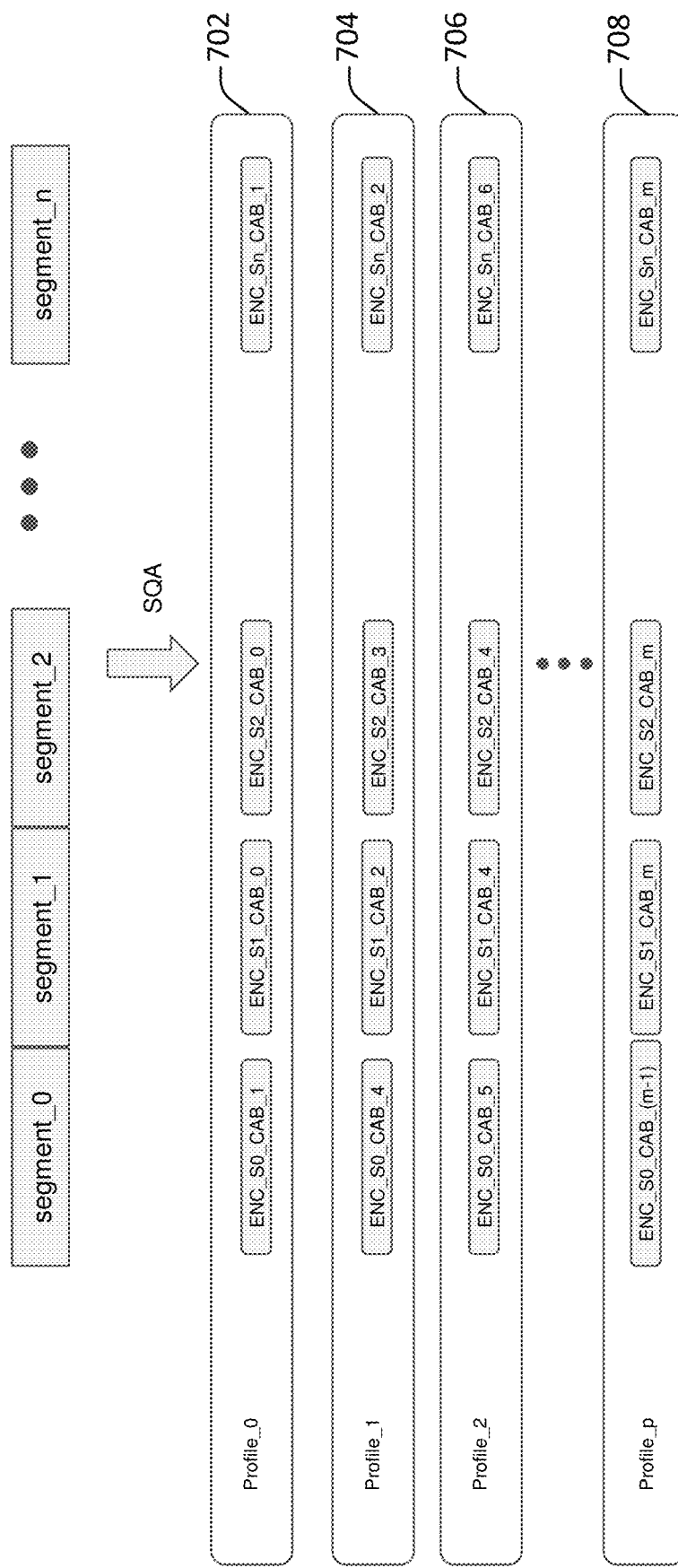
FIG. 7 depicts an example of the selected encoded segments for profiles for each segment according to some embodiments.

FIG. 7 depicts an example of the selected encoded segments for profiles for each segment according to some embodiments. At 702, 704, 706, and 708, the encoded segments are shown for Profile_0, Profile_1, Profile_2 and Profile_P, respectively. Within a profile, SQA system 108 may select different encoded segments with different candidate average bitrates for different segments. For example, for profile_0, segment_0 was encoded using candidate average bitrate CAB_1, segment_1 was encoded using candidate average bitrate CAB_0, segment_2 was encoded using candidate average bitrate CAB_0, etc. In some examples, in profile_0, segment_0 was encoded using the bitrate 7750 Kbps, segment_1 was encoded using the bitrate 8500 and segment_2 was encoded using the bitrate 8500 Kbps. For profile_1, segment_0 was encoded using CAB_4, segment_1 was encoded using CAB_2 and segment_2 was encoded using CAB_3. For example, in profile 1, segment_0 was encoded using the bitrate 5500 Kbps, segment_1 was encoded using the bitrate 7000 Kbps and segment_2 was encoded using the bitrate 6250 Kbps.

The following will now describe the optimization process to dynamically generate a list of candidate average bitrates.

Optimization Process

As discussed above, video content may have diverse characteristics, such as content in different videos may have different characteristics and also content within the same video may have different characteristics. For example, some content may be simple to encode, such as a cartoon or news. However, some content may be difficult to encode, such as in live action movie or sports. The characteristics for the encodings may be different. The following will describe different characteristics for content.

Figure 8:
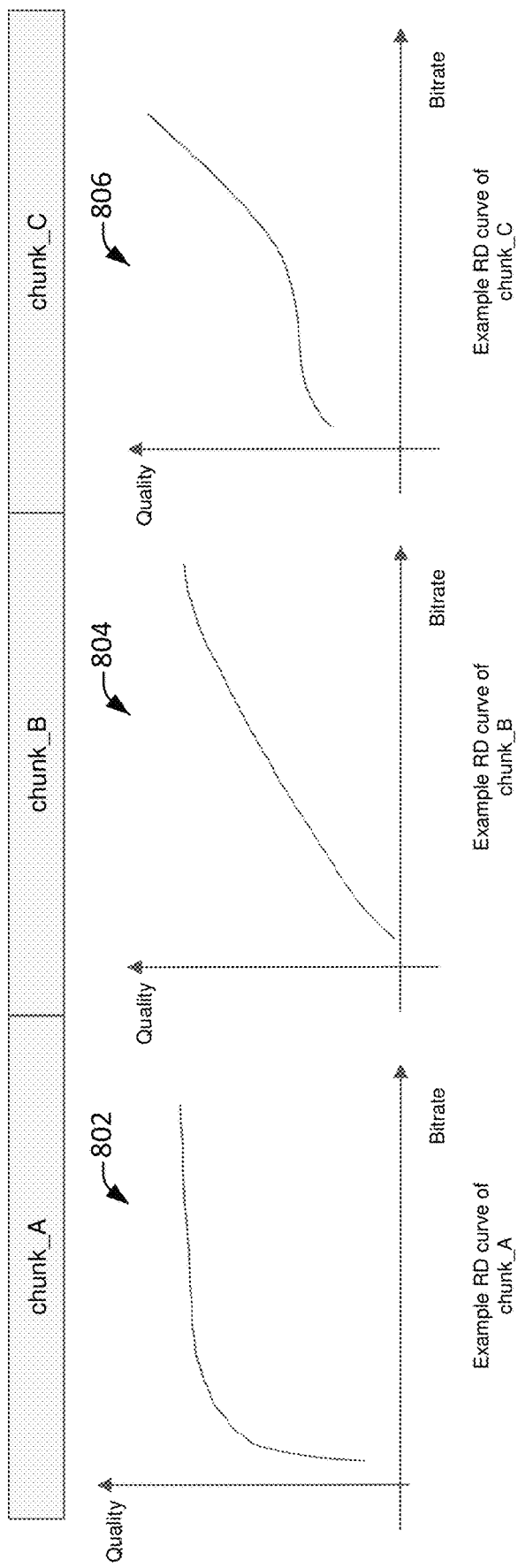
FIG. 8 depicts an example of different rate distortion curves for video content according to some embodiments.

FIG. 8 depicts an example of different rate distortion curves for video content according to some embodiments. A rate distortion curve is used to illustrate the relationship between quality and bitrate, but other metrics may be used to show the relationship between quality and bitrate for video content. The different rate distortion curves may be illustrated for different chunks of a video; however, the rate distortion curves may be different for different portions of a video, such as segments, chunks, multiple chunks, or different videos.

Three chunks of chunk_A, chunk_B, and chunk_C are shown with graphs 802, 804 and 806, respectively, of rate distortion curves for the chunks. In graph 802, the quality changes with a steep slope at lower bitrates, but at higher bitrates, the quality does not change very much. In graph 804, the quality changes as bitrate increases with a steady relationship. In graph 806, the quality at lower bitrates may only minimally change, while the quality increases with a steep slope at higher bitrates.

Figure 9:
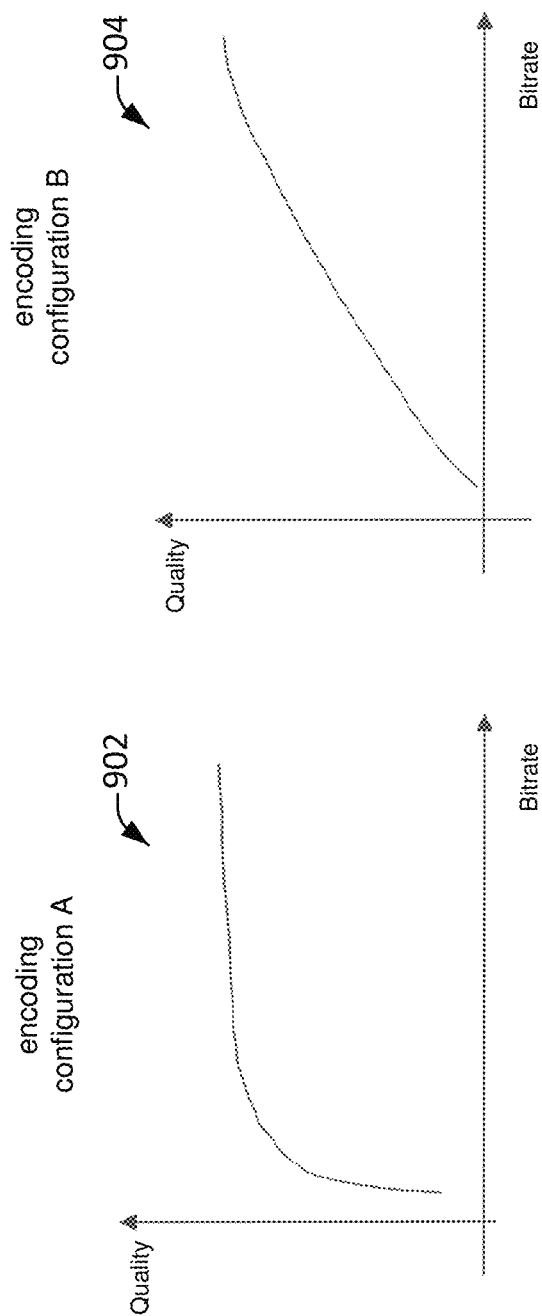
FIG. 9 shows different characteristics using different encoding configurations according to some embodiments.

In addition to different content producing different rate distortion curves, different encoding configurations may also produce different encoding results. Different encoding configurations may include using a different encoder "(e.g., x264, x265, etc.) or different encoding parameters (rate distortion optimization (RDO) level, B-frames, reference number, etc.). FIG. 9 shows different characteristics using different encoding configurations according to some embodiments. For the same segment or chunk, the first encoding configuration at 902 produces different characteristics compared to a second encoding configuration shown at 904. An encoding configuration A produces a rate distortion curve similar to chunk_A above and encoding configuration B produces a rate distortion curve similar to chunk_B above even though these rate distortion curves are for the same content.

Figure 10:
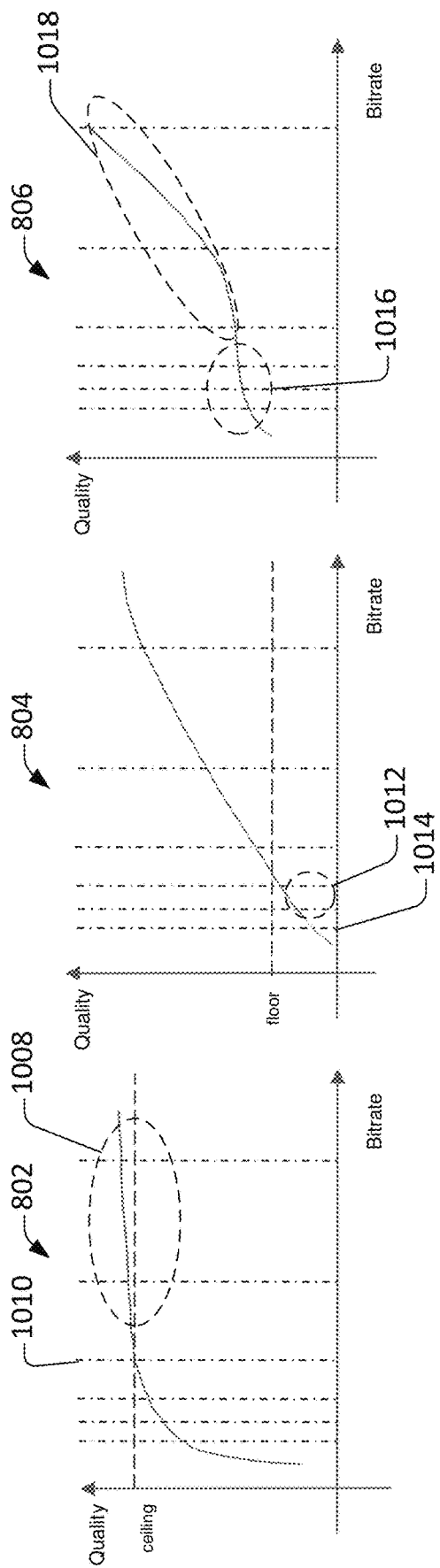
FIG. 10 depicts an example of using static candidate average bitrates for different rate distortion curves according to some embodiments.

Considering the above rate distortion curves may differ, using a static list of candidate average bitrates may not be optimal. For example, using the same list of candidate average bitrates for different rate distortion curves may not produce optimal results. FIG. 10 depicts an example of using static candidate average bitrates for different rate distortion curves according to some embodiments. Graphs 802, 804 and 806 depict the different rate distortion curves for different chunks that were shown in FIG. 8. The dotted lines in each graph show the different bitrates of the list of candidate average bitrates. Some problems may result when using the fixed list of candidate average bitrates. For example, in graph 802, at 1008, the two highest candidate average bitrates may be redundant because they have similar qualities with the third candidate average bitrate at 1010. That is, only one bitrate may need to be encoded, such as at the bitrate listed at 1010, to provide an encoded segment with similar quality.

In graph 804, at 1012, the two candidate average bitrates may be redundant because these two encoded segments have similar qualities compared to an encoded segment with the next lowest bitrate shown at 1014. Similar to above, only one bitrate may need to be encoded, such as at the lowest bitrate at 1014, to provide an encoded segment with similar quality.

In graph 806, at 1016, the lowest three candidate average bitrates may produce encoded segments that have similar qualities. Also, at 1018, the candidate average bitrates may be too far apart because the difference in quality may be too great between the encoded segments. That is, may be more desirable to have more candidate average bitrates with less quality difference to minimize the difference in quality between the candidate average bitrates.

Figure 11:
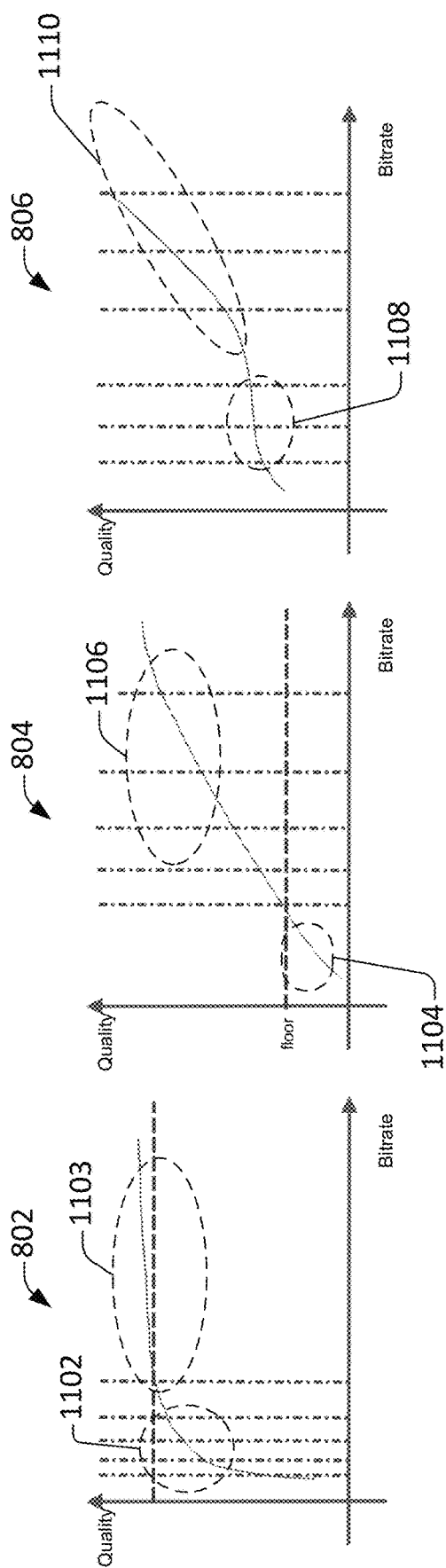
FIG. 11 depicts an optimized candidate average bitrate list according to some embodiments.

FIG. 11 depicts an optimized candidate average bitrate list according to some embodiments. In graph 802, SQA system 108 may dynamically select the candidate average bitrates to optimize the quality found in the encoded segments. For example, at 1102, SQA system 108 may increase a number of candidate average bitrates at bitrates where the curve is steep. Also, at 1103. SQA system 108 may reduce the number of candidate average bitrates where the curve does not change quality very much.

In graph 804, at 1104, SQA system 108 may remove candidate average bitrates from the lowest bitrates where the quality may be redundant. Also, at 1106, SQA system 108 may add additional bitrates to capture the changing quality at higher bitrates.

In graph 806, at 1108, SQA system 108 may remove bitrates at the lower end of the curve. Also, at 1110, SQA system 108 may space the candidate average bitrates more evenly to capture different levels of quality in more even increments.

Pre-Analysis Optimization Process Design

Figure 12:
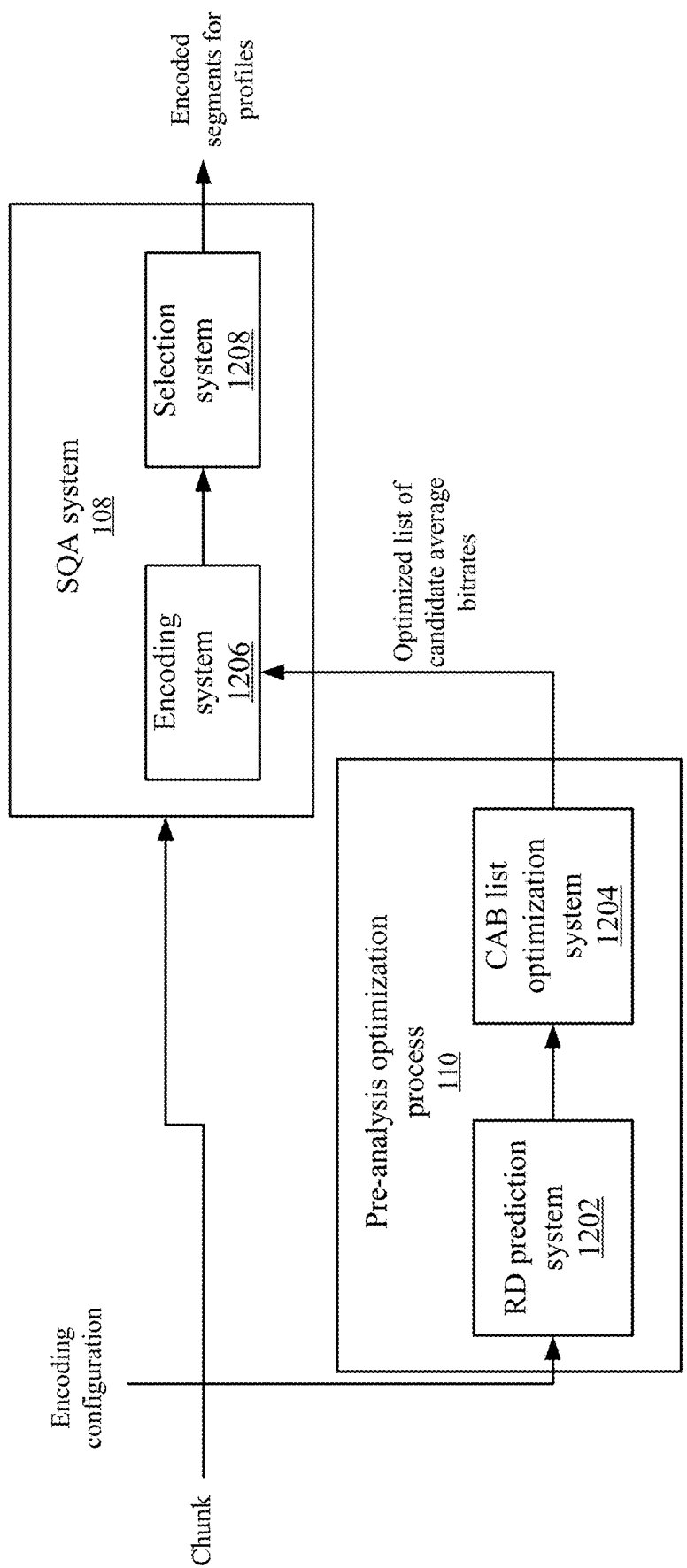
FIG. 12 depicts a more detailed example of a segment quality driven adaptive processing system (SQA) system and pre-analysis optimization process according to some embodiments.

FIG. 12 depicts a more detailed example of SQA system 108 and pre-analysis optimization process 110 according to some embodiments. A chunk to be encoded is received. Also, an encoding configuration may be received that defines settings for encoding the chunk. The encoding configuration may include an encoder type, quality level, etc.

Pre-analysis optimization process 110 may receive the chunk and the encoding configuration, and output an optimized list of candidate average bitrates. An RD prediction system 1202 may predict a rate distortion curve for segments in the chunk and/or the chunk. Although predicting rate distortion curves for segments or chunks may be described, the rate distortion curves may be generated for different portions of the video, such as for multiple chunks and/or multiple segments. As will be discussed in more detail below, RD prediction system 1202 may use machine learning logic to generate the prediction of rate distortion curves for segments.

The predicted rate distortion curves are output to a CAB list optimization system 1204. CAB list optimization system 1204 may optimize a list of candidate average bitrates for a chunk, such as based on the predicted rate distortion curves for the segments in the chunk. The optimized list of candidate average bitrates may be based on the characteristics of respective chunks and may be different for chunks that have content with different characteristics. The process will be described in more detail below.

CAB list optimization system 1204 outputs an optimized list of candidate average bitrates to SQA system 108. SQA system 108 includes an encoding system 1206 that receives the encoding configuration, the chunk, and the optimized list of candidate average bitrates. Then, encoding system 1206 uses each candidate average bitrate in the list to encode each segment of the chunk. After encoding each segment using the list of candidate average bitrates, a selection system 1208 selects an encoded segment for each profile in a profile ladder using a selection process as described above. Selection system 1208 outputs encoded segments that are selected for the profiles in the profile ladder.

The following will describe the prediction of the characteristics of a segment and then the optimization to select the list of candidate average bitrates.

RD Prediction System

Figure 13:
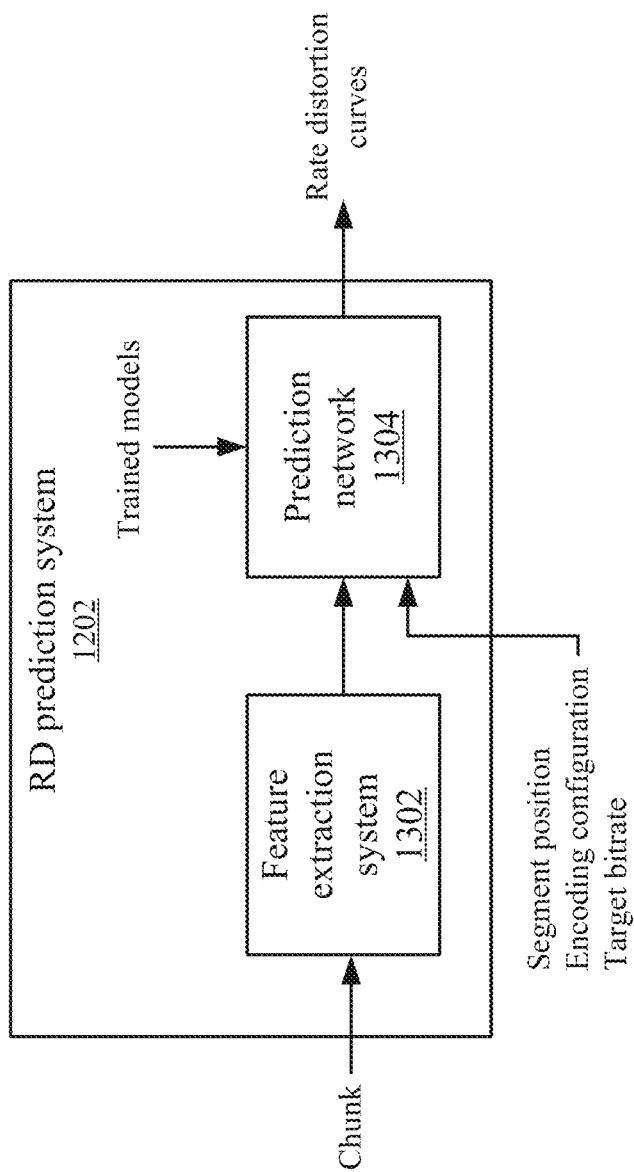
FIG. 13 depicts a more detailed example of a rate distortion (RD) prediction system according to some embodiments.

FIG. 13 depicts a more detailed example of RD prediction system 1202 according to some embodiments. A feature extraction system 1302 receives a chunk of video. Feature extraction system 1302 may then extract values for features that may convey information related to video transcoding. Some examples of features may be about the video content, encoding settings, etc. The features that are extracted may provide better predictions of the characteristics of the segments of the chunk. The values for the features are output to a prediction network 1304.

Prediction network 1304 may use trained models to generate characteristics for segments of the chunk, such as a predicted rate distortion curve. Prediction network 1304 may use different machine learning algorithms, such as support vector machine (SVM) regression, convolution neural networks (CNN), boosting, etc. Trained models may be trained based on the specific machine learning algorithm.

Prediction network 1304 may receive the values for the features in addition to other input, such as the segment position, an encoding configuration, and a target bitrate. The segment position may be the segment position (e.g., which segment in the video) in which to generate a rate distortion curve, the encoding configuration may include configuration will be used to encode the segment, and the target bitrate may include the output bitrate range for the segments. Prediction network 1304 may output rate distortion curves for the segments between the output bitrate range based on the features.

Figure 14:
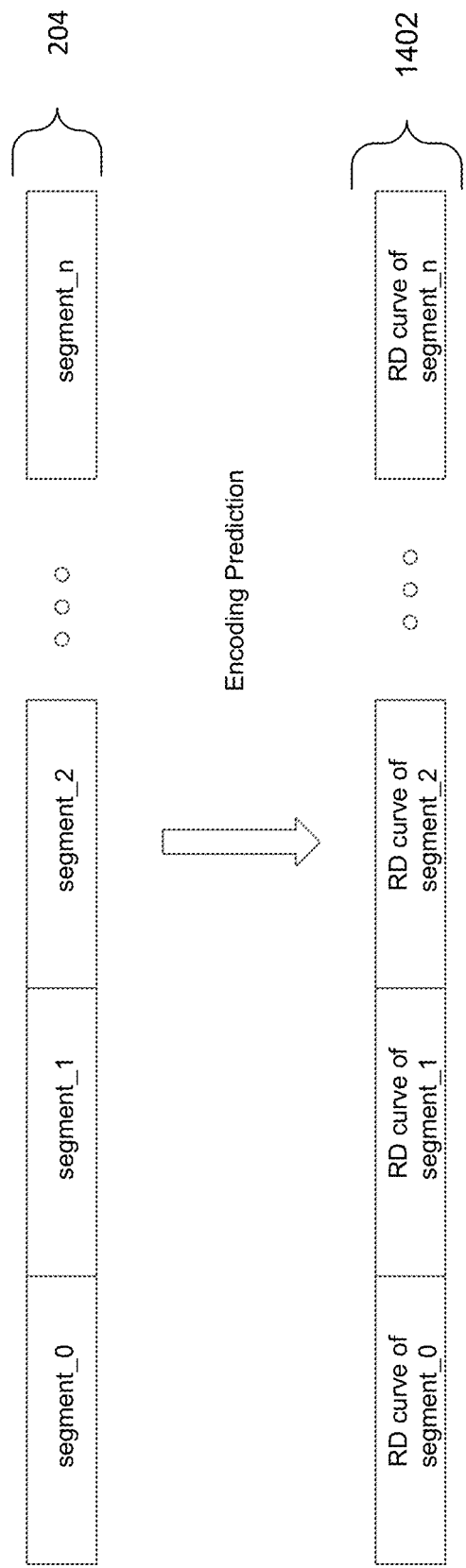
FIG. 14 depicts the output of a prediction network according to some embodiments.

FIG. 14 depicts the output of prediction network 1304 according to some embodiments. At 204, segments for a chunk include segment_0, segment_1, segment_2, . . . , segment_n. A rate distortion curve may be generated for each segment in each chunk of the video. For example, at 1402, rate distortion curves are output for each respective segment. A rate distortion curve of segment_0, a rate distortion curve of segment_1, etc. are shown. Each rate distortion curve is based on characteristics for a respective segment. The list of candidate average bitrates for the chunk may be generated based on the rate distortion curves. Also, a chunk level rate distortion curve may be output.

List of Candidate Average Bitrate Optimization

Figure 15:
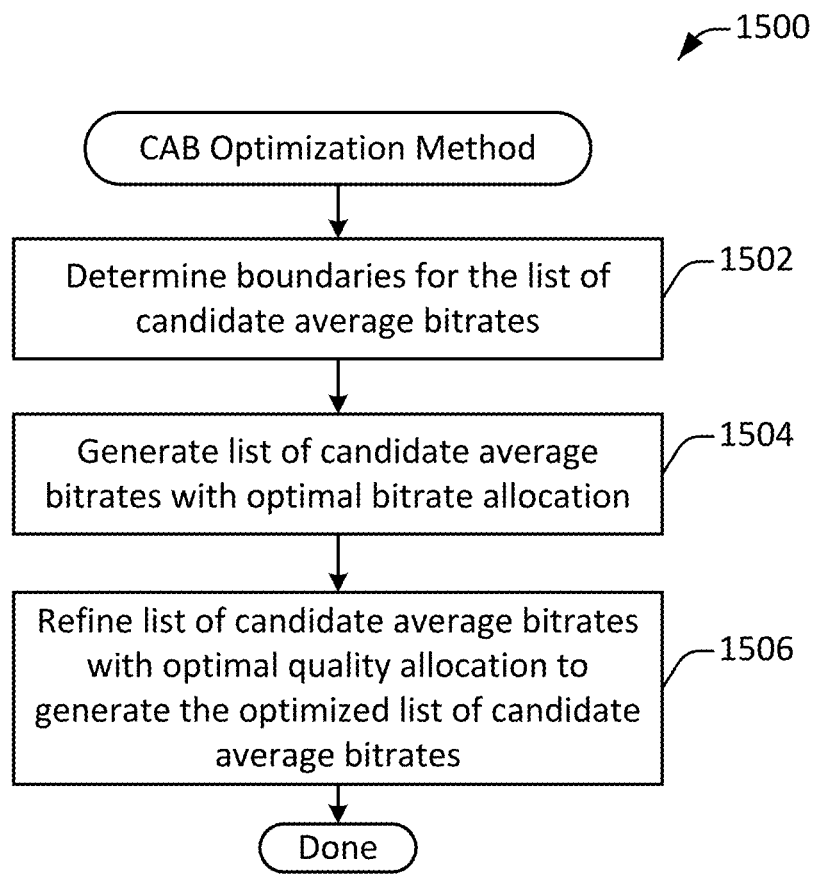
FIG. 15 depicts a simplified flowchart of a method for performing an optimization process for selecting the list of candidate average bitrates according to some embodiments.

FIG. 15 depicts a simplified flowchart 1500 of a method for performing an optimization process for selecting the list of candidate average bitrates according to some embodiments. At 1502, CAB list optimization system 1204 determines boundaries for the list of candidate average bitrates. For example, the boundaries may be a maximum bitrate and a minimum bitrate that can be used for the list of candidate average bitrates. Different methods may be used to determine the boundaries and are described in more detail in FIG. 16.

At 1504, CAB list optimization system 1204 generates a list of potential candidate average bitrates with optimal bitrate allocation. In some embodiments, one list of potential candidate average bitrates is generated for a chunk based on the maximum bitrate and the minimum bitrate determined at 502. The list of potential candidate average bitrates may be generated using different methods. One method may be using a predefined list that falls between the minimum bitrate and the maximum bitrate. For example, the predefined list may include bitrates from target average bitrates and intermediate average bitrates. For example, bitrates from the predefined list within the minimum and maximum may be used. Another method may determine a total number of potential candidate average bitrates and divide the bitrate range between the minimum bitrate and the maximum bitrate into intervals. Different examples may be used, such as:

Equal division: $\text{interval}\_(i+1)/\text{interval}\_i=1$

Progressive division: $\text{interval}\_(i+1)=\text{interval}\_i+\text{delta}$

Geometric division: $\text{interval}\_(i+1)/\text{interval}\_i=1.5, 1.618\ldots$ Fibonacci division: $\text{interval}\_(i+2)=\text{interval}\_(i+1)+\text{interval}\_i$, where interval_i is an interval value of i, interval_(i+1) is interval value+1, interval_(i+2) is interval value+2, and delta is a predefined value.

The total number of intervals may be set to a number, such as 10. The interval of interval_i may be set based on the above methods by dividing the range into the total number. CAB list optimization system 1204 then selects the bitrates based on the interval value to divide the range of bitrates between the minimum bitrate and the maximum bitrate into a list of bitrates. For example, a minimum bitrate of 2000 and a maximum bitrate of 10,000 with an interval of 1500 and a total number of bitrates of five may result in a list of bitrates of 10,000, 7500, 5000, 3500, and 2000 when using equal division.

At 1506, CAB list optimization system 1204 refines the list of potential candidate average bitrates with optimal quality allocation to generate the optimized list of candidate average bitrates. The quality allocation may examine per segment quality and determine whether the quality fulfills one or more rules. For example, redundant candidate average bitrates may be removed, such as candidate average bitrates that have similar quality. Also, additional candidate average bitrates may be added as needed, such as when adjacent candidate average bitrates have a quality gap that is above the threshold, such as a difference that is too large. The process will be described in more detail in FIGS. 17, 18, and 19.

Figure 16:
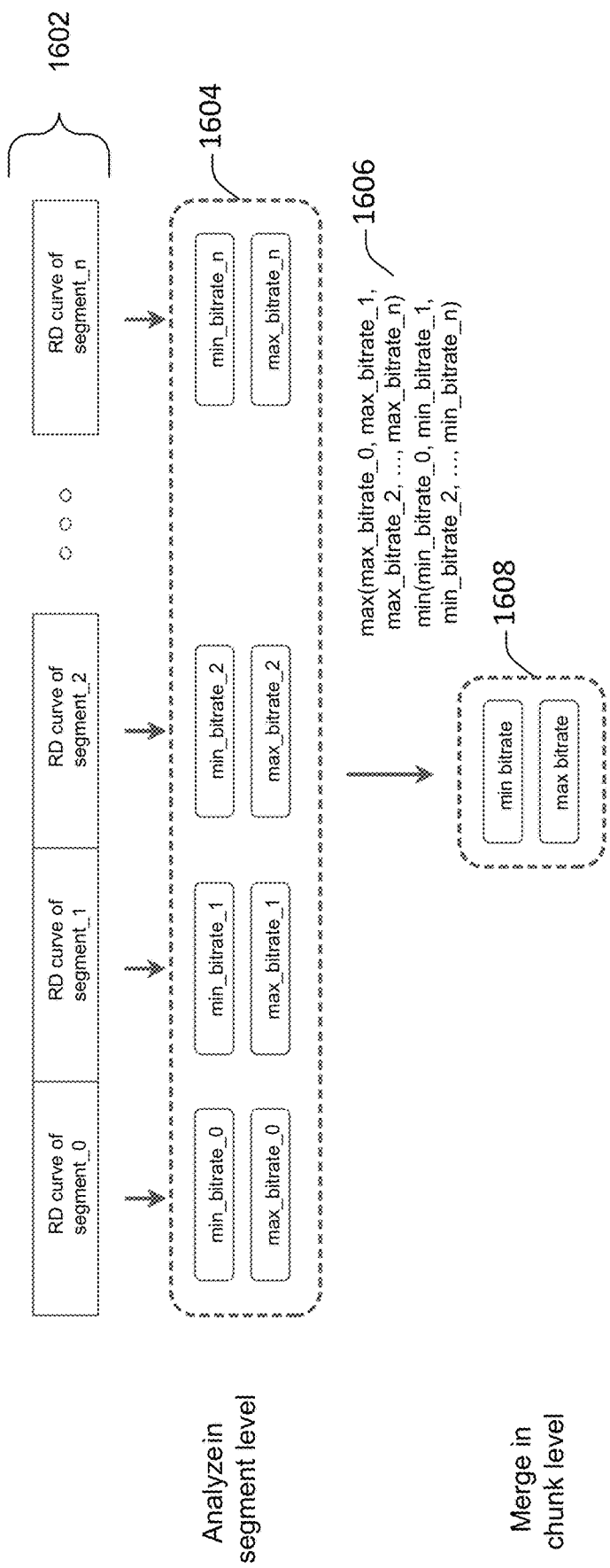
FIG. 16 depicts an example of determining the boundaries for the list of candidate average bitrates according to some embodiments.

As described in 1502 in FIG. 15, CAB list optimization system 1204 determines the boundaries for the list of candidate average bitrates. FIG. 16 depicts an example of determining the boundaries for the list of candidate average bitrates according to some embodiments. Although the following process is described, other processes may be appreciated. For example, a setting may be used to determine the minimum bitrate and the maximum bitrate. In this example, CAB list optimization system 1204 may analyze the minimum bitrates and the maximum bitrates for rate distortion curves for respective segments in a chunk and determine what the minimum bitrate and the maximum bitrate should be at the chunk level.

At 1602, rate distortion curves for respective segments are received and analyzed. Then, CAB list optimization system 1204 may select the minimum bitrate and the maximum bitrate for each segment based on the respective rate distortion curve for the segment. For example, for segment_0, a minimum bitrate and a maximum bitrate are selected based on the characteristics of the rate distortion curve for segment_0. For example, CAB list optimization system 1204 may set a maximum quality threshold and a minimum quality threshold, and use the rate distortion curve to determine the minimum bitrate that corresponds to the minimum quality threshold and the maximum bitrate that corresponds to the maximum quality threshold. For segment_1, CAB list optimization system 1204 selects a minimum bitrate and a maximum bitrate based on the characteristics of the rate distortion curve for segment_1, and so on.

The above analysis was performed at the segment level. Then, CAB list optimization system 1204 analyzes the segment level results to determine a minimum value and a maximum value at the chunk level. At 1606, CAB list optimization system 1204 determines a maximum value from the values for the maximum bitrates for the segments, such as from max_bitrate_0, max_bitrate_1, max_bitrate_2, . . . , max_bitrate_n. Also, CAB list optimization system 1204 determines a minimum value from the values for the minimum bitrates for the segments, such as from min_bitrate_0, min_bitrate_1, min_bitrate_2, . . . , min_bitrate_n.

At 1608, CAB list optimization system 1204 outputs the minimum bitrate and the maximum bitrate for the chunk. In this case, the lowest minimum bitrate from the minimum bitrates for the segments is selected and the highest maximum bitrate from the maximum bitrates for the segments is selected. The selection process may take into account the individual characteristics of rate distortion curves for segments and select a minimum bitrate and a maximum bitrate that may be inclusive of all of the minimum bitrates and the maximum bitrates that were determined at the segment level. For example, if the minimum bitrates are 2000, 3000, and 3500, the minimum bitrate that is selected will be 2000. Similarly, if the maximum bitrates are 10000, 9000, and 8500, the maximum bitrate that is selected will be 10000. Although the above process may be used, other methods of selecting the minimum bitrate and the maximum bitrate may be appreciated, such as taking an average of the values.

Figure 17:
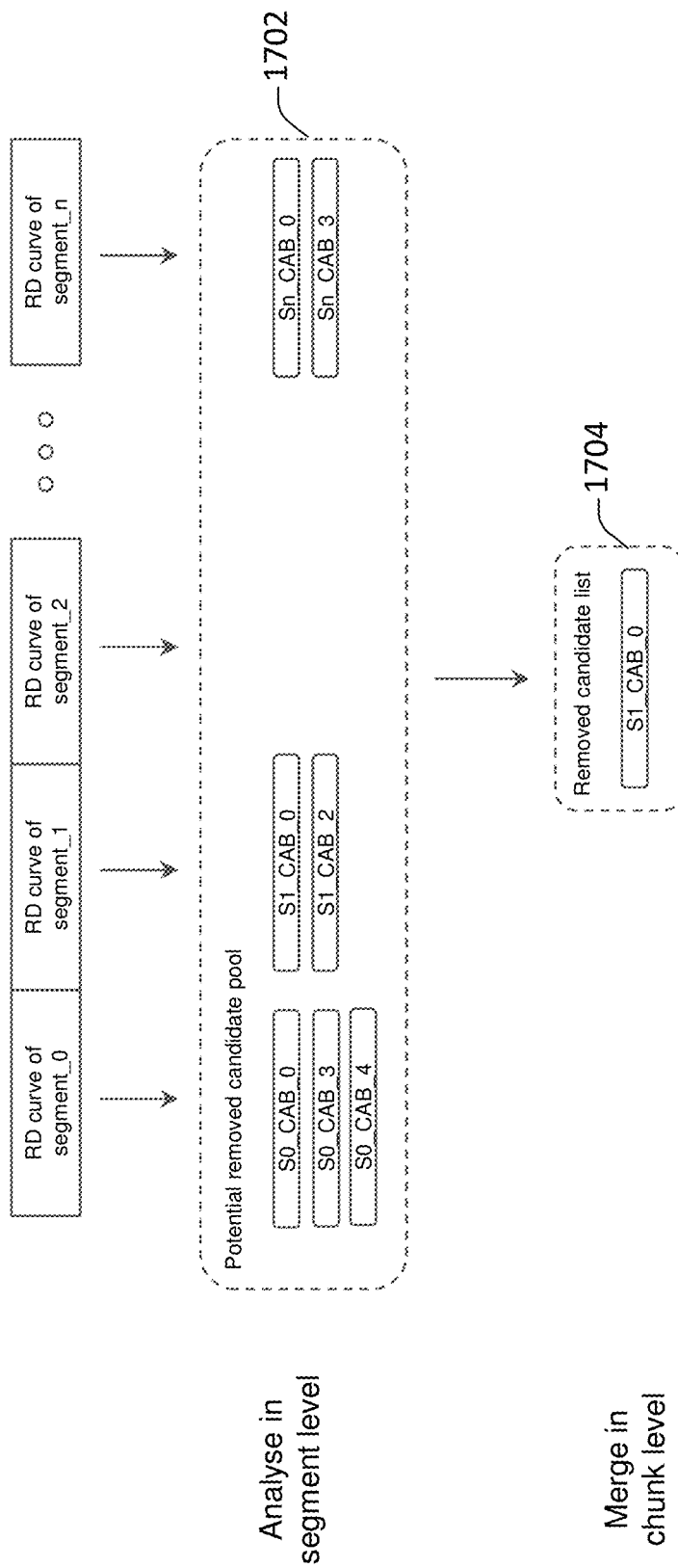
FIG. 17 depicts an example of removing candidate average bitrates based on quality according to some embodiments.

As described in 1506 in FIG. 15, CAB list optimization system 1204 defines the list of candidate average bitrates with optimal quality allocation. One part of the allocation involves removing candidate average bitrates based on similar quality. The similarity of quality may be defined in different ways. For example, CAB list optimization system 1204 a distance between values of quality to determine whether some candidate average bitrates should be removed. FIG. 17 depicts an example of removing candidate average bitrates based on quality according to some embodiments. In this example, CAB list optimization system 1204 may determine if the quality levels of two adjacent candidate average bitrates meet a threshold, such as are within a threshold. Then, the candidate with the higher bitrate may be removed.

At 1702, each segment may have an associated potential removal list of encoded segments that can be potentially removed. As shown, for segment_0, CAB list optimization system 1204 has determined that the candidate average bitrates of S0_CAB_0, S0_CAB_3 and S0_CAB_4 may be removed. These candidate average bitrates may be removed because the encoded segments may have a similar quality level that meets a threshold with an adjacent encoded segment. Similarly, for segment_1, CAB list optimization system 1204 has determined that the candidate average bitrates of S1_CAB_0 and S1_CAB_2 may be removed, and for segment_n, CAB list optimization system 1204 has determined that the candidate average bitrates for Sn_CAB_0 and Sn_CAB_3 may be removed. No segments are removed for segment_2 because no segments are determined to have similar quality within a threshold.

The above analysis was at the segment level. Then, at 1704, CAB list optimization system 1204 may use the segment level candidate average bitrates to determine candidate average bitrates to remove at the chunk level. For example, based on the occurrence of a candidate average bitrate in different segments of the potential removal list, CAB list optimization system 1204 may select candidate average bitrates for the chunk level. In some embodiments, CAB list optimization system 1204 may select a candidate average bitrate and calculate the total number of occurrences in the potential removed candidate pool. If the total number for this candidate average bitrate meets a threshold, such as is at or above a threshold, CAB list optimization system 1204 puts this candidate average bitrate in the removed candidate list at the chunk level. For example, the candidate average bitrate CAB_0 is found in three of the segments described above (e.g., segment_0, segment_1, and segment_n) and meets a threshold of "3". Then, CAB list optimization system 1204 puts the candidate average bitrate of CAB_0 into the removed candidate list. Candidate average bitrates CAB_2, CAB_3 and CAB_4 may not meet the threshold because the bitrates occur in two or fewer segments in the potential removal list. Accordingly, CAB list optimization system 1204 does not put these candidate average bitrates in the removed candidate list. Other methods of selecting which candidate average bitrates to remove may be appreciated.

The above analysis was performed at the segment level and merged to the chunk level. However, the process may be performed at different levels. For example, the analysis may be used to merge candidate average bitrates from multiple chunks to portion of video that covers the multiple chunks level or from multiple chunks to the video level.

Figure 18:
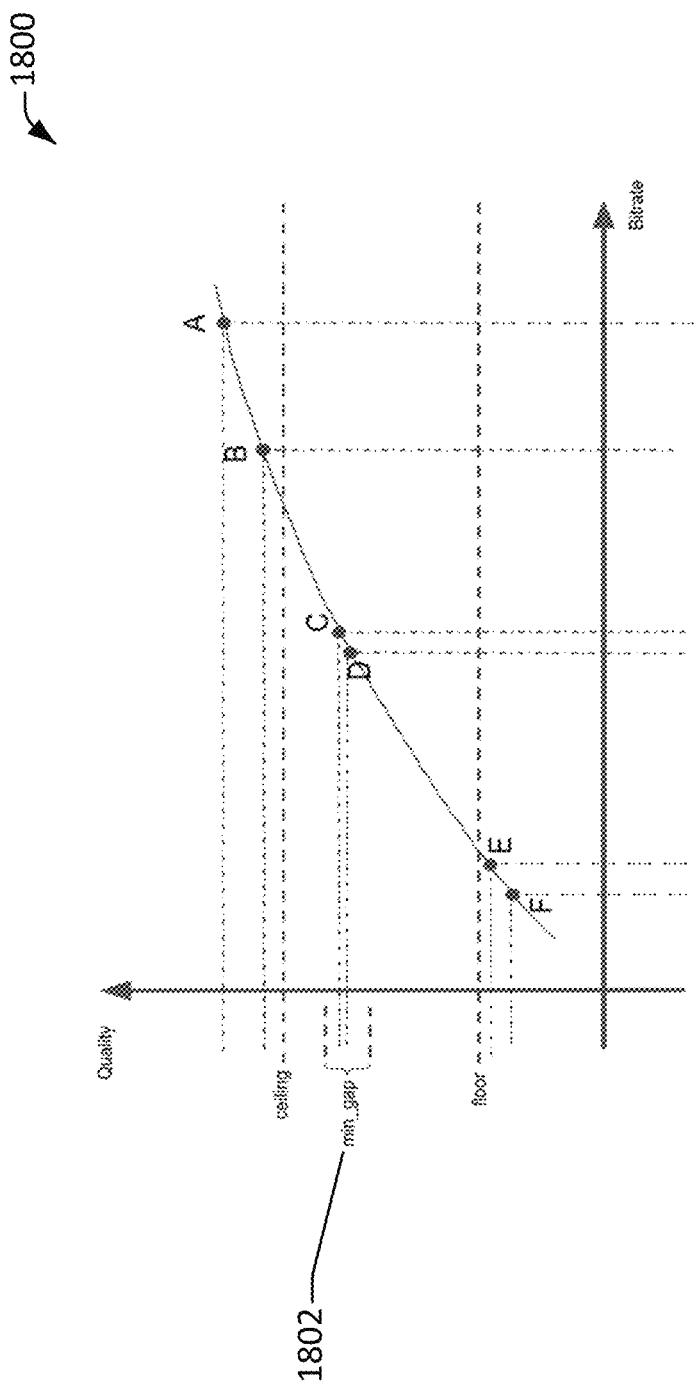
FIG. 18 depicts an example where a minimum gap is used to remove a candidate average bitrate according to some embodiments.

The following will describe an example of removing candidate average bitrates. FIG. 18 depicts an example where a minimum gap is used to remove a candidate average bitrate according to some embodiments. For example, at 1802, candidate average bitrates C and D have similar quality levels that meet a threshold, such as a threshold min_gap. In this case, CAB list optimization system 1204 determines that one of the candidate average bitrates should be removed, such as candidate average bitrate C because this candidate average bitrate is adjacent to candidate average bitrate D and candidate average bitrate C has a larger bitrate than candidate average bitrate D, but with minimal quality advantages. In this case, CAB list optimization system 1204 may compare a difference between the values of quality for adjacent candidate average bitrates to the threshold, min_gap, and remove one of the candidate average bitrates when the threshold is met.

Figure 19:
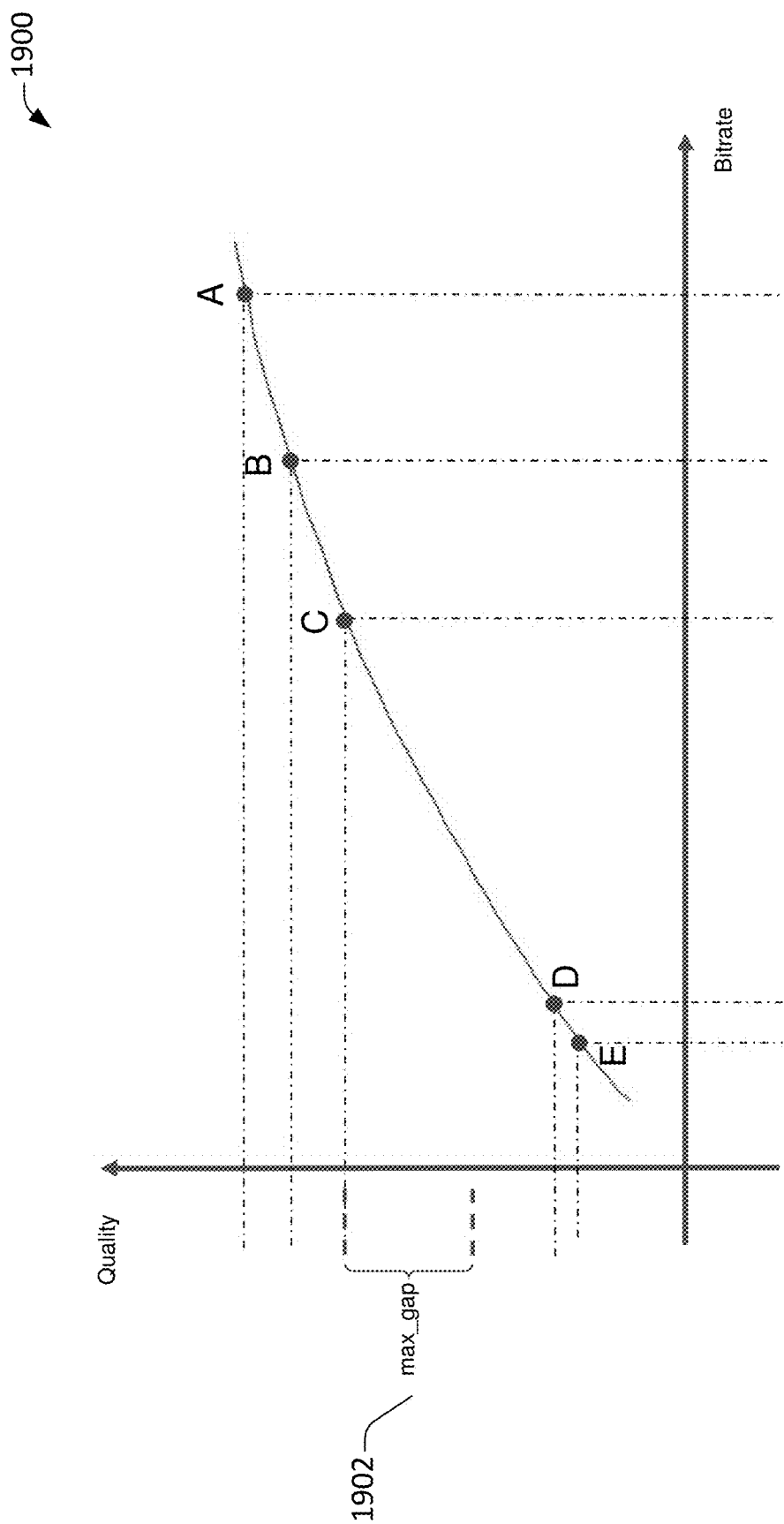
FIG. 19 depicts a graph that shows where adding candidate average bitrates may be advantageous according to some embodiments.

Another part of the quality allocation involves adding candidate average bitrates based on a gap of quality. FIG. 19 depicts a graph 1900 that shows where adding candidate average bitrates may be advantageous according to some embodiments. CAB list optimization system 1204 may use a threshold, such as a maximum gap max_gap at 1902, to determine when to add candidate average bitrates. For example, if there is a gap of quality values between adjacent candidate average bitrates that is larger than the threshold max_gap, such as between candidate average bitrates C and D in graph 1900, CAB list optimization system 1204 may add a candidate average bitrate in between candidate average bitrates C and D on the rate distortion curve.

Different methods may be used to determine how many new candidate average bitrates should be added. CAB list optimization system 1204 may add "i" new candidates when two candidates that are separated by a threshold based on a ratio. For example, different ratios may configure the gap between added candidates, such as a 1:1, which means each gap is equal, 1:1.5, which means each gap is 1.5, or other ratios.

In one possible process, the variable i is set to i=1, CAB list optimization system 1204 adds i new candidate average bitrates based on a ratio. For example, one candidate average bitrate named "F" may be added between points C and D. Then, if all the gaps between the new adjacent candidate average bitrates are less than the threshold max_gap, then the process is finished. However, if not, the value for the variable i is incremented, such as to "2" and two new candidates are added in between the candidate average bitrates based on the ratio. For example, two more candidate average bitrates may be added between points C and F and F and D. The process then continues as described above. Once candidate average bitrates have been added such that there are no gaps greater than the threshold between candidate average bitrates D and C, the candidate average bitrates are output.

Figure 20:
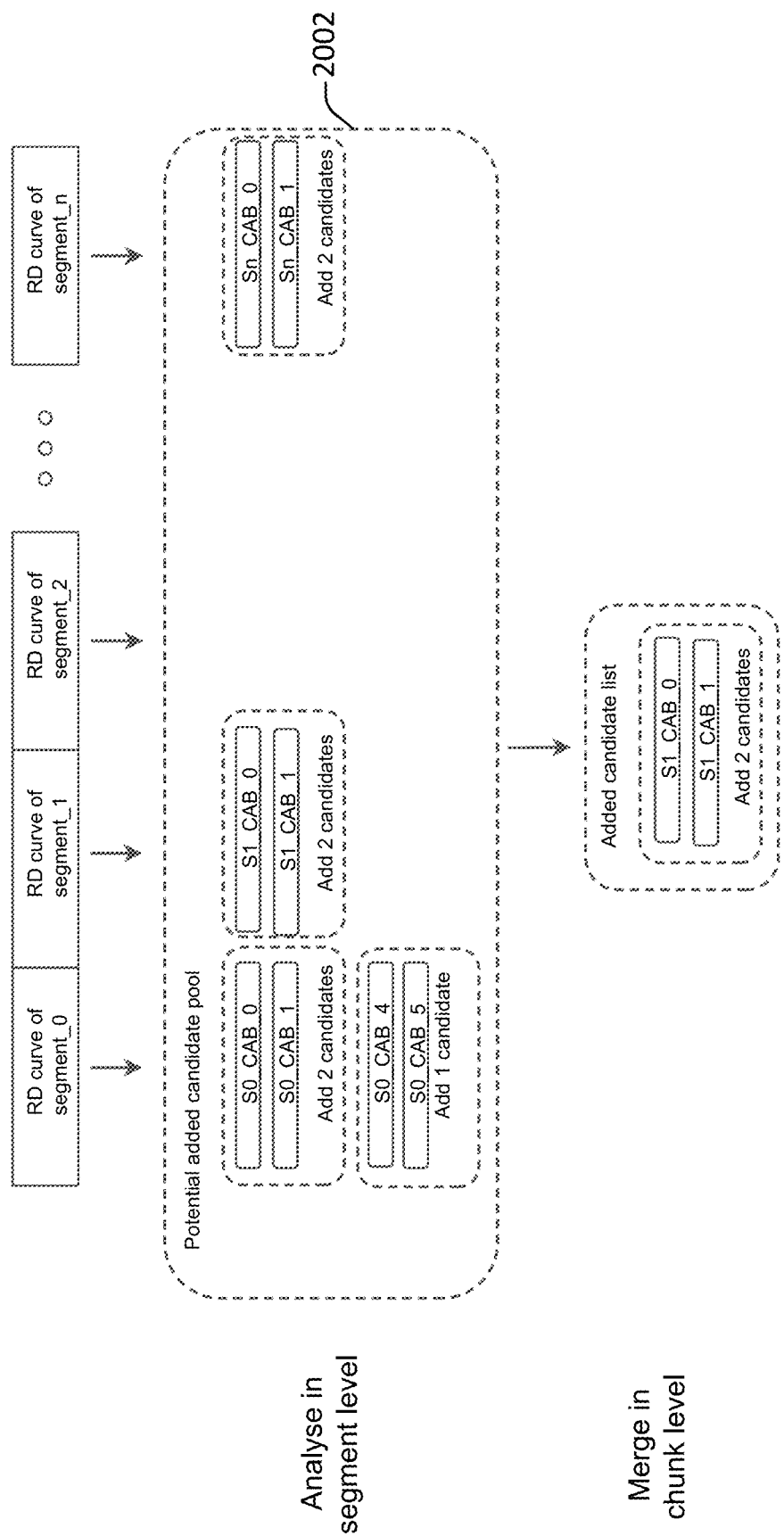
FIG. 20 depicts the determination of adding candidate average bitrates according to some embodiments.

The above process is determined for each segment. Then, CAB list optimization system 1204 may take the potential added candidate average bitrates at the segment level and merge the candidate average bitrates at the chunk level. FIG. 20 depicts the determination of adding candidate average bitrates according to some embodiments. At 2002, each segment may have candidate average bitrates that may be potentially added. For segment_0, two candidate average bitrates may be added in between candidate average bitrates CAB_0 and CAB_1. Also, one candidate average bitrate may be added between CAB_4 and CAB_5. For segment_1, two candidate average bitrates may be added between candidate average bitrate CAB_0 and CAB_1. For segment_n, two candidate average bitrates may be added between candidate average bitrate CAB_0 and CAB_1. Accordingly, three segments have added two candidate average bitrates between candidate average bitrate CAB_0 and CAB_1 and one segment added one candidate average bitrate between CAB_4 and CAB_5.

CAB list optimization system 1204 may use the segment level candidates to determine an added candidate list for the chunk. For example, to be added to the added candidate list at the chunk level, CAB list optimization system 1204 may determine whether potential added candidate average bitrates at the segment level are found within a threshold, such as a number of segments. If the threshold is 70% of the segments, CAB list optimization system 1204 adds two candidates between the candidate average bitrates CAB_0 and CAB_1 because these candidates are found in greater than 70% of the segments (3 segments out of 4). CAB list optimization system 1204 does not add candidates between CAB_4 and CAB_5 because this addition is only found in segment_0 and is less than 70% of the segments. In this case, adding the additional candidate average bitrate may not be needed because only one segment requires the addition and it may not be useful to add a candidate average bitrate for all the other segments of the chunk if only one segment is affected. However, the addition of two candidate average bitrates between the candidate average bitrates CAB_0 and CAB_1 may be beneficial because more than 70% of the segments had the potential addition.

The output of CAB list optimization system 1204 is a candidate average bitrate list for each chunk. For example, the list of candidate average bitrates for each chunk as described in FIG. 3A are output by CAB list optimization system 1204 according to some embodiments.

Conclusion

Accordingly, the list of candidate average bitrates may be optimized based on the characteristics found in each segment. This produces an improved candidate average bitrate list for each chunk that is optimized for respective characteristics of the chunk. The candidate average bitrates may improve the quality the selection of encoded segments that are available to select for profiles for each chunk. This may improve the quality of the video in addition to improving the playback experience.

Prediction of Rate Distortion Curves

RD prediction system 1202 may generate a prediction of a relationship between bitrate and quality for a video. As mentioned above, the relationship may be referred to as a rate distortion curve (RD curve). The rate distortion curve may be predicted for different target configurations. For example, for adaptive bitrate video transcoding, a high resolution source video may be converted and encoded into multiple resolutions (e.g., 4K (3840×2160 pixels), 1080p (1920×1080), 720p (1280×720), 360p (480×360), etc.). For each resolution, RD prediction system 1202 may predict a rate distortion curve. For example, if the resolutions include 1080p, 720p, and 360p, RD prediction system 1202 may generate three rate distortion curves at different bitrates for the three respective resolutions. The multiple rate distortion curves at different resolutions may be referred to as a rate distortion map. Although three rate distortion curves are discussed, many more rate distortion curves may be required for a video. In additional to more resolutions, there may be multiple target configurations that require new rate distortion maps, such as a new rate distortion map is required for different combinations of settings for encoding the video. If there are two encoder types of encoder #1 and encoder #2, RD prediction system 1202 may generate different target configurations for each encoder. Then, for each encoder, RD prediction system 1202 may generate three rate distortion curves for a total of six rate distortion curves.

Conventionally, a rate distortion map may be used in different ways, such as to design an optimal transcoding system for generating encoded bitstreams for adaptive bitrate systems. Conventionally, the rate distortion map may be only obtained via a large number of actual encodings of the given video. For example, one encoding job can generate one quality value for one bitrate and resolution pair. Multiple encoding jobs must be run at each bitrate to generate a rate distortion curve for the target configuration. When there are multiple target resolutions and target configurations, a large number of encoding jobs have to be run to generate the rate distortion curves. Accordingly, the cost of processing time and computational resource is very high to generate the rate distortion curves. When a service is transcoding multiple videos, the processing time and computational resources needed to generate the rate distortion curves may not be practical.

In some embodiments, RD prediction system 1202 predicts one or more rate distortion maps for a video. This improves the use of computational resources in that actual encoding jobs to generate the rate distortion curves for each target configuration and resolution may not need to be run. Further, the predictions may be generated faster than running actual encoding jobs. The prediction may also be improved, such as by using proxy encoding information. The proxy encoding information may use encoding results from an actual encoding to generate the prediction. However, the proxy encoding information may be collected from a different encoding configuration from the target configuration being used in the prediction, such as by a configuration using a fast preset setting when encoding of the video. The fast preset setting may include simplifications to allow the encoding to be performed faster, such as a smaller resolution of the input video, less target bitrate, decimated video frames, etc. The proxy encoding information will be described in more detail below.

System Overview

Figure 21:
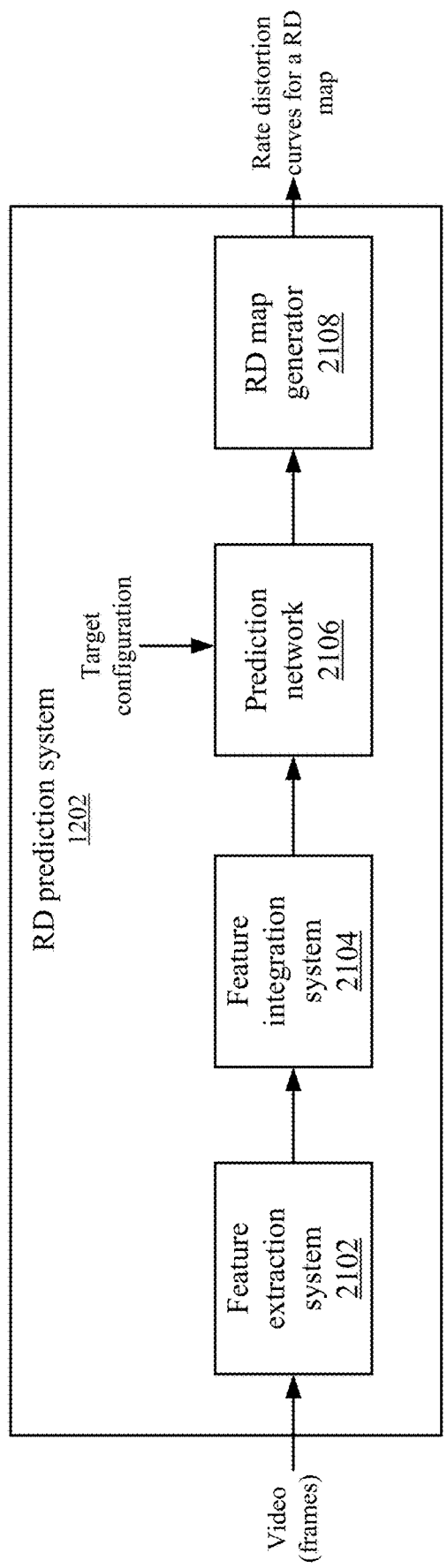
FIG. 21 depicts an example of the RD prediction system according to some embodiments.

FIG. 21 depicts an example of RD prediction system 1202 according to some embodiments. RD prediction system 1202 may generate rate distortion curves for rate distortion maps. As discussed above, rate distortion maps may be important because video content may have diverse characteristics. For example, some content may be simple to encode such as cartoons or news, while some content may be difficult to encode such as movies or sports. The rate distortion curves for different content may be different as described above in FIG. 8, which shows different rate distortion curves for different chunks of a video. Also, FIG. 9 shows different rate distortion curves for different encoding configurations for the same segment. FIG. 10 and FIG. 11 show the advantages of using the rate distortion curves to select bitrates for an adaptive bitrate algorithm. As described above, SQA system 108 may dynamically select the candidate average bitrates to optimize the quality found in the encoded segments. For example, SQA system 108 may increase a number of candidate average bitrates at bitrates where the curve is steep, reduce the number of candidate average bitrates where the curve does not change quality very much, remove candidate average bitrates from the lowest bitrates where the quality may be redundant, add additional bitrates to capture the changing quality at higher bitrates, remove bitrates at the lower end of the curve, and may space the candidate average bitrates more evenly to capture different levels of quality in more even increments. Although the rate distortion curves may be used for adaptive bitrate algorithms, the prediction of quality values may be used for other purposes. In some embodiments, the prediction of rate distortion curves may be used in different encoding optimization systems. For example, in per-title encoding and per-segment encoding, a system may predict a rate distortion curve for title level or segment level of one video. The system could determine a dynamic target bitrate for a higher quality with same bitrate or lower bitrate with same quality for the title or segments. For an encoding parameters optimization, a system may use different encoding parameters to predict different rate distortion curves. Then, the system may select suitable encoding parameters for some videos. In generating an adaptive quality ladder of different profiles (e.g., bitrates and resolutions), a system could predict rate distortion curves for different resolutions and bitrates. Then, the system may select different resolution and bitrate groups based on the rate distortion curves to optimize the bitrates and resolutions in the groups to set adaptive profile ladder for different videos. RD prediction system 1202 may receive a video, such as frames of the video, and generate rate distortion curves for a rate distortion map. A feature extraction system 2102 may receive the frames of a video. Then, feature extraction system 2102 may extract values for a list of features based on characteristics of each frame of the video. A feature integration system 2104 may integrate frame level features into portions of the video. For example, as discussed above, segments may be a portion of the video, such as six seconds of the video or multiple frames. Feature integration system 2104 may integrate the frame level features into segment level features that describe the features at the segment level. The start frame and end frame of a segment may be determined in different ways. For example, a setting may be received that defines the segments or the segments may be determined dynamically by analyzing characteristics of the video to generate segments. Although segment level features are discussed, other portions of video may be used, such as frame level, chunk level, etc.

A prediction network 2106 may receive the segment level features and a target configuration. The target configuration may include a combination of different parameters. For example, parameters of the target configuration may include a target start frame/end frame, target resolutions, target bitrates, target quality metrics, and target encoders. For example, parameters may include the target resolutions (640×360, 1280×720, 1920×1080, etc.), target bitrates (500 kbps, 1 Mbps, 3 Mbps, 6 Mbps, etc.), target quality metrics (PSNR. VMAF, EPS, etc.), target encoding configurations (e.g., a target encoder (AVC, HEVC, AV1, etc.), target encoding settings (faster preset, slower preset, etc.)). Different combinations of the parameters may be generated. For example, a first target configuration may be the target resolutions (640×360, 1280×720, 1920×1080, etc.), target bitrates (500 kbps, 1 Mbps, 3 Mbps, 6 Mbps, etc.), a target quality metric (PSNR), a target encoding configuration (e.g., target encoder (AVC), and target encoding settings (faster preset). A second target configuration may be the target resolutions (640×360, 1280×720, 1920×1080, etc.), target bitrates (500 kbps, 1 Mbps, 3 Mbps, 6 Mbps, etc.), a target quality metric (VMAF), a target encoding configurations (e.g., target encoder (HEVC), target encoding settings (slower preset). Although each combination may be listed as a target configuration, a list of possible parameter settings may be received, and then RD prediction system 1202 generates different combinations. Using the first target configuration, prediction network 2106 may predict a list of quality values (PSNR) for multiple bitrates (500 kbps, 1 Mbps, 3 Mbps, 6 Mbps, etc.) at each resolution (640×360, 1280×720, 1920×1080, etc.) for an AVC encoder using a faster preset. Using the second target configuration, prediction network 2106 may predict a list of quality values (VMAF) for multiple bitrates (500 kbps, 1 Mbps, 3 Mbps, 6 Mbps, etc.) at each resolution (640×360, 1280×720, 1920×1080, etc.) for an HEVC encoder using a slower preset. The result of the output may be multiple quality values for bitrates. An RD map generator 2108 may generate the rate distortion curves from the quality values, and then a rate distortion map from the rate distortion curves. A rate distortion map may be for one target configuration. If multiple target configurations are being processed, RD prediction system 1202 may generate a rate distortion map for each target configuration.

The following will now describe different parts of RD prediction system 1202 in more detail.

Feature Extraction

Figure 22:
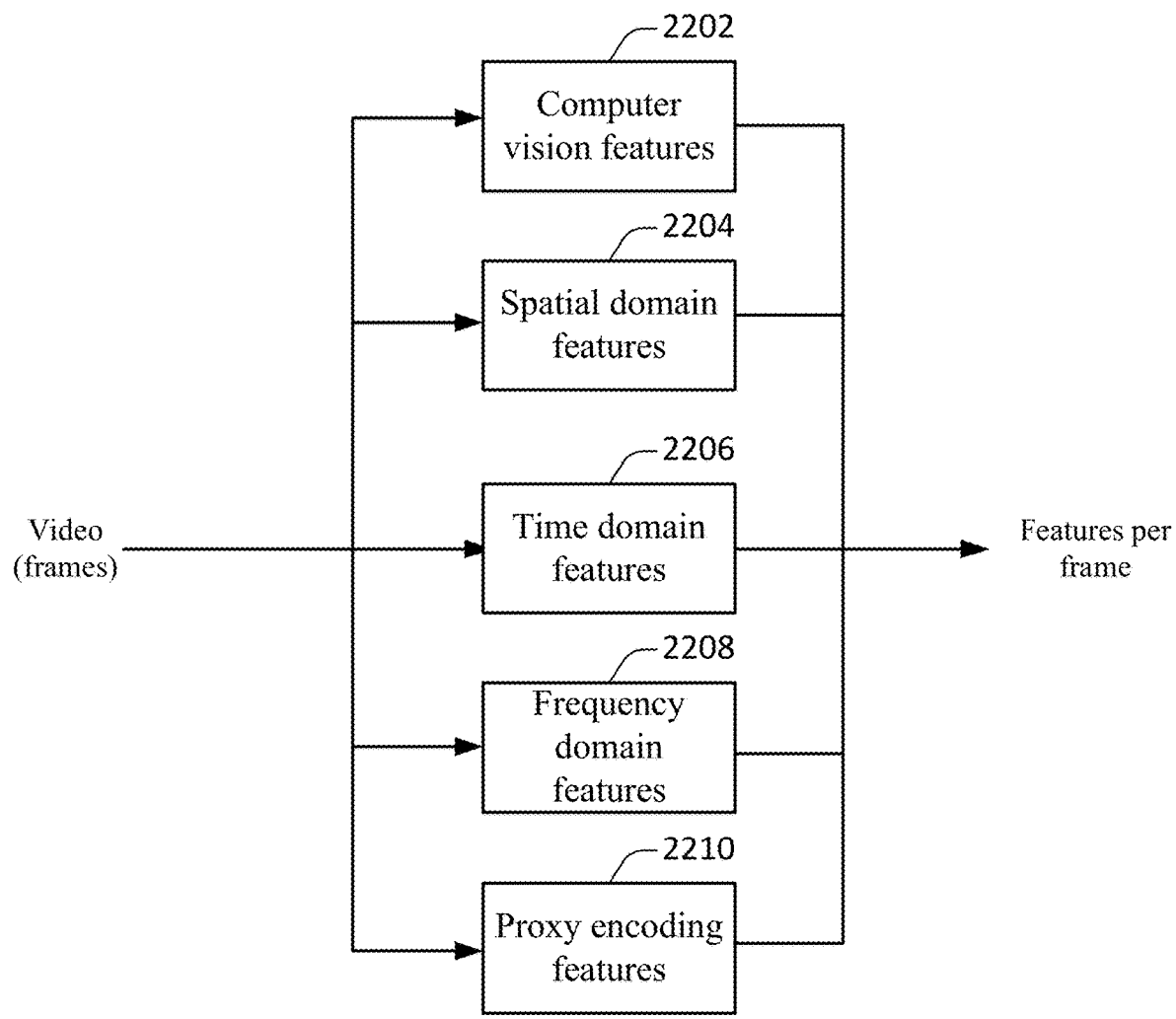
FIG. 22 depicts an example of features that can be extracted according to some embodiments.

Feature extraction system 2102 may extract different kinds of features for frames of the video. In some embodiments, a feature extraction system 2102 may extract features associated with computer vision features, spatial domain features, time domain features, frequency domain features, and proxy encoding features, but other features may also be used. FIG. 22 depicts an example of features that can be extracted according to some embodiments. At 2202, computer vision features may include different features regarding the visual characteristics of a frame. Computer vision features may describe some detailed information of this frame. For example, the gradient of Sobel, if this value is higher, it means this frame is complex, and the encoder may use more bitrate to encode this frame. Therefore, the encoding bitrate could be higher and quality could be lower, and vice versa if the value is lower. For example, features may be used that are based on an average, a variance, and a histogram of the pixel values; a gradient of Sobel and Laplace operations; a blur strength; a noise strength; etc. The values may be organized at a pixel level, block level, frame level, etc.

At 2204, spatial domain features may analyze differences of content, such as a similarity and/or a redundancy of content of a frame. Spatial-domain features may describe the similarity and redundancy of the frame, therefore, if the content in the frame has lots of redundancy and similarity, the encoding bitrate could be lower and quality could be higher, and vice versa. The features may be based on intra prediction to calculate a sum of absolute differences (SAD) to determine the similarity or redundancy of the content of the frame. The features may be organized differently, such as by different block sizes of 4×4, 8×8, 16×16, etc.

At 2206, time domain features may be based on features associated with multiple frames. Time-domain features may describe motion speed and motion complexity of the adjacent frames, therefore, if the contents in these frames move slow and predictably, the encoding bitrate could be lower and quality could be higher, and vice versa. For example, the time domain features may be based on a similarity, a motion speed, and a motion complexity of adjacent frames. Feature extraction system 2102 may use inter prediction to calculate a motion vector (MV) and a sum of absolute differences between objects in frames to convey the similarity, motion, speed, or motion complexity of adjacent frames. The features may be organized by different block sizes also.

At 2208, frequency domain features may be based on frequency domain information of the frame. Frequency-domain features may describe the frequency domain information of the frame, which is another view to see this frame. If the frame is complex in the frequency domain, an encoder may use more bitrate to encode this frame, therefore, the encoding bitrate could be higher and quality could be lower, and vice versa. Feature extraction system 2102 may use different frequency domain information, such as discreet cosine transformation (DCT)/discreet sine transformation (DST) transform coefficients. The features may be organized by block size also.

At 2210, proxy encoding features may be based on an actual encoding of the video. The proxy encoding features have a relationship with encoding results, and have positive correlation to a prediction of encoding results for the video. The configuration that is used to perform the actual encoding may be different from the target configuration being processed for the prediction. In some embodiments, the proxy encoding features may be determined based on a lower computing resource consumption encoding compared to the target configuration. In other embodiments, a faster preset of an encoder may be used to generate the proxy encoding. An encoder may have different presets, such as fast, slow, medium, that use different amounts of computing resources (e.g., slow may use more computing resources, but may generate a higher quality encoding). Also, the proxy encoding may have other simplifications, such as a smaller resolution of the input video, less target bitrate, decimated video frames (e.g., less video frames), different encoders, etc. Accordingly, the proxy encoding configuration may not be an exact copy of the target configuration and may be designed to be performed faster. The proxy encoding features may also be used for multiple target configurations. In some embodiments, one proxy encoding is performed and used in a prediction for multiple target configurations. The proxy encoding results may be used to generate the proxy encoding features. Some examples of proxy encoding features include a frame type quantization parameter, quality, bitrate, etc. that result from the actual proxy encoding.

Feature Integration

Figure 23:
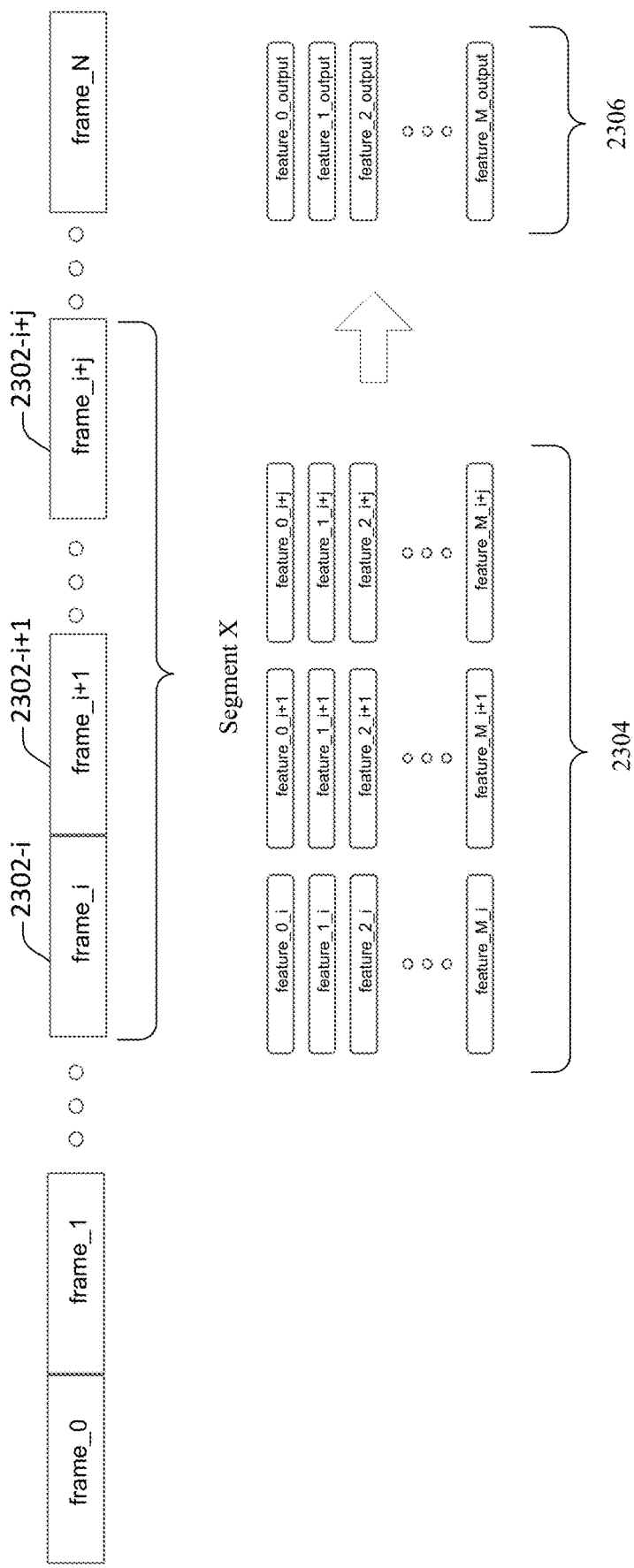
FIG. 23 depicts an example of frames of a video according to some embodiments.

Feature integration system 2104 may integrate frame level features into segment level features. As discussed above, segment level features may be processed, but this step may not be necessary if frame level features are being used in the prediction. FIG. 23 depicts an example of frames of a video according to some embodiments. A segment X is shown that includes frame_i, frame_i+1, frame_i+j at 2302-$i$, to 2302-$i$+1, 2302-$i$+j. Each frame may be associated with multiple features in a segment at 2304, such as features feature_0_i, feature_1_i, feature_2_i, feature_M_i for frame frame_i.

Feature integration system 2104 may integrate respective features to generate segment level features at 2306 of feature_0_output, feature_1_output, feature_2_output, feature_M_output. Different methods may be used to determine the segment level features. In some embodiments, the average value of each feature may be calculated from each frame of the segment. For example, feature integration system 2104 may generate the average value for the feature values for feature_0 for each frame. The average value for other features is calculated similarly.

In another example, before the average is calculated, feature integration system 2104 may remove some values from some of the frames that meet a threshold. In some embodiments, some outlier values from frames may be removed. For example, one frame may have a value for the feature that may much different (e.g., above a threshold) than the features from other frames and may skew a segment level value to not be representative of a majority of the frames of the segment. Different methods of calculating the outlier may be used. In some embodiments, the average of a feature for frames of the segment may be calculated and a standard error of the feature is calculated. A score that compares the average value to the standard error may be used to determine if a score for the feature is an outlier. If the score meets a threshold, then that feature may be removed. The score may not be removed if the threshold is not met. Then, feature integration system 2104 may calculate the average value for the feature based on the list of features that have not been removed.

The result of integrating the features at the frame level into the segment level may be average values for each feature. Although average values are discussed, other methods of integrating or combining the features may be used, such as using median values from the frames. After integrating the features at the segment level, then prediction of the rate distortion map may be generated.

Prediction

Prediction network 2106 may predict a list of quality values for multiple bitrates based on a target configuration. Prediction network 2106 may use the segment level features from feature integration system 2104 and the target configuration to output a list of predicted quality values. Prediction network 2106 may use one or more models that can be trained to perform the prediction. In some embodiments, prediction network 2106 may predict a quality value for each bitrate of a target resolution. For example, for a target resolution 640×360, prediction network 2106 predicts a quality value for the target bitrates 500 Kbps, 1 Mbps, 3 Mbps, 6 Mbps, etc. Then, for a target resolution of 1280× 720, prediction network 2106 predicts a quality value for the target bitrates 500 Kbps, 1 Mbps, 3 Mbps, 6 Mbps, etc. If multiple target configurations are used, then the following process may be performed for each target configuration.

Figure 24:
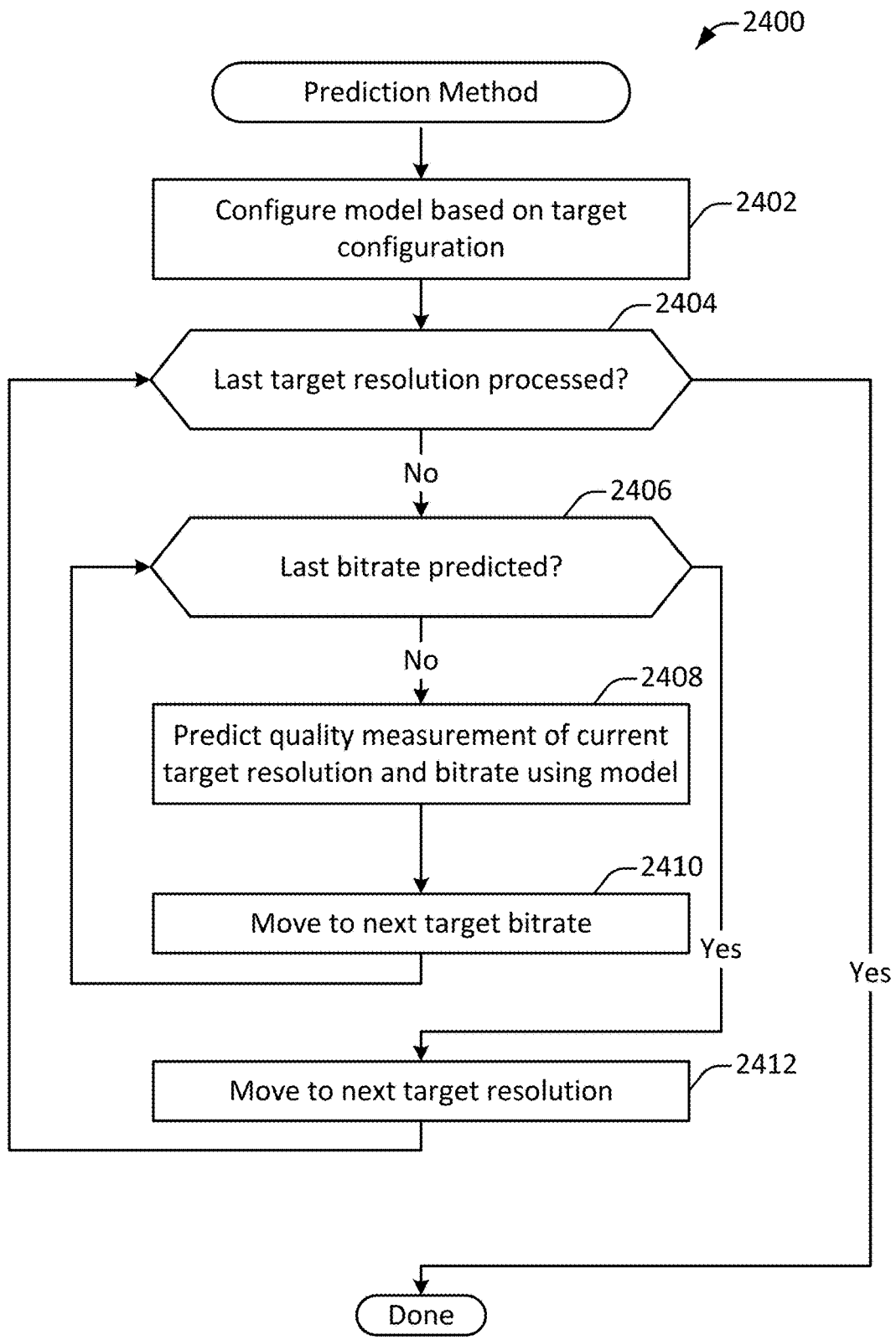
FIG. 24 depicts a simplified flowchart of a prediction method according to some embodiments.

FIG. 24 depicts a simplified flowchart 2400 of a prediction method according to some embodiments. The following process may be performed for each segment of the video. That is, quality values for rate distortion maps are generated for each segment. At 2402, RD prediction system 1202 configures a model based on the target configuration. For example, each target configuration may be associated with a model that can predict the quality values. In other embodiments, a single model may predict the quality values for multiple target configurations. Different methods may be used to configure the model, such as supervised and unsupervised training.

After configuring the model, the quality values may be predicted. Different methods of generating the quality values are discussed at least in FIGS. 26 and 27, but other methods may be used. At 2404, RD prediction system 1202 determines if the last target resolution has been processed. For example, the target resolutions may include 640×360, 1280× 720, 1920×1080, etc. If the last target resolution has been processed, then the process may end. If the last target resolution has not been processed, then at 2406, RD prediction system 1202 determines if the last bitrate has been processed. As discussed above, prediction network 2106 may predict quality values for multiple bitrates for each target resolution.

If the last bitrate has not been processed, at 2408, RD prediction system 1202 predicts a quality value of the current target resolution and current bitrate using the model of prediction network 2106. The prediction may receive the features for a segment and the target configuration, and output a quality value for the bitrate. For example, the prediction may be a quality value for a target resolution of 640×360 and a target bitrate 500 kbps.

At 2410, RD prediction system 1202 moves to the next target bitrate for the resolution. For example, after the 500 kbps bitrate, the next target bitrate may be 1 Mbps. The process then reiterates to 2406. For each bitrate, prediction network 2106 predicts the quality value. For example, the other bitrates may be 3 Mbps. 6 Mbps, etc. When the last bitrate has been predicted, the process moves to 2412 where the next target resolution is processed. For example, another target resolution may be 1280×720. Then, the process reiterates to 2404, and RD prediction system 1202 determines if the last target resolution has been processed. If not, the process continues to process bitrates for the new target resolution. The same bitrates as described above may be used. The process ends when all target resolutions have been processed, such as after that target resolution of 1920×1080 is processed.

The prediction may predict quality values for each resolution and bitrate pair instead of the rate distortion curve. The prediction may be improved compared to predicting the curve because predicting all the details to generate the rate distortion curve may require predicting lots of detailed information, such as some parts of the curve increase faster and some parts increase slower, the slope of portions of the curve are different, the shape of curves are totally different, etc. Therefore, it may be hard to predict the rate distortion curve directly. However, RD prediction system 1202 may use more detailed information to generate points on the rate distortion curve, which can then be used to estimate the curve. However, the prediction may predict the quality measurements for a rate distortion curve based on a single input.

Figure 25:
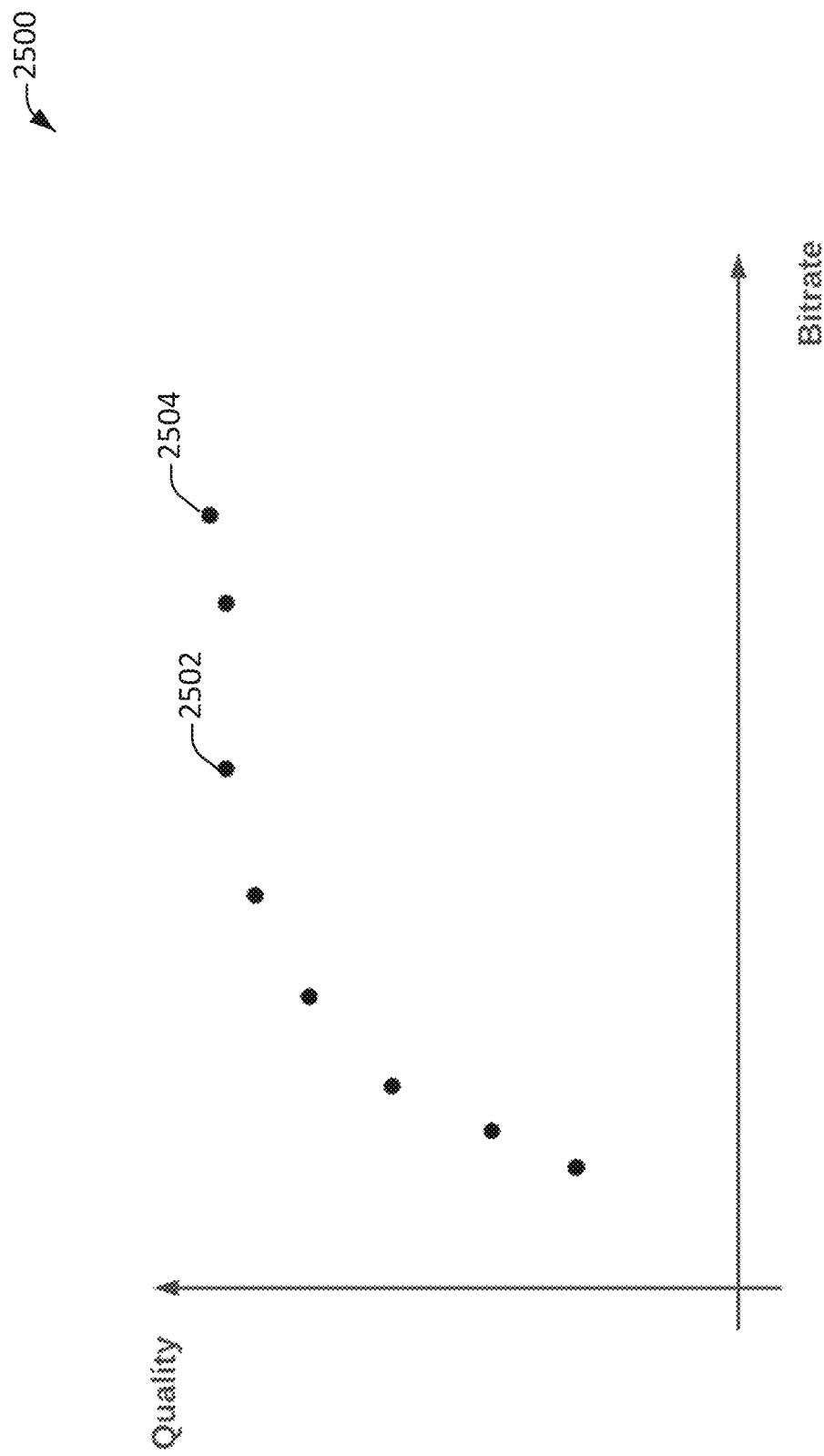
FIG. 25 depicts a graph that lists quality values for bitrates for one target resolution according to some embodiments.

FIG. 25 depicts a graph 2500 that lists quality values for bitrates for one target resolution according to some embodiments. Graph 2500 provides a list of quality values for a single target configuration in only one resolution. The X-axis may be bitrate and the Y-axis may be quality. Each point in graph 2500 may represent a quality value output by prediction network 2106. For example, a point at 2502 is a quality value prediction for a first bitrate and a point at 2504 is a quality value for a second bitrate. Multiple resolutions may have respective associated points as shown in FIG. 25.

The prediction of the quality value of the current target resolution and bitrate as described in 2408 may be performed in different ways. The following will describe two methods of a direct prediction mode and an indirect prediction mode.

Direct Prediction Mode

Figure 26:
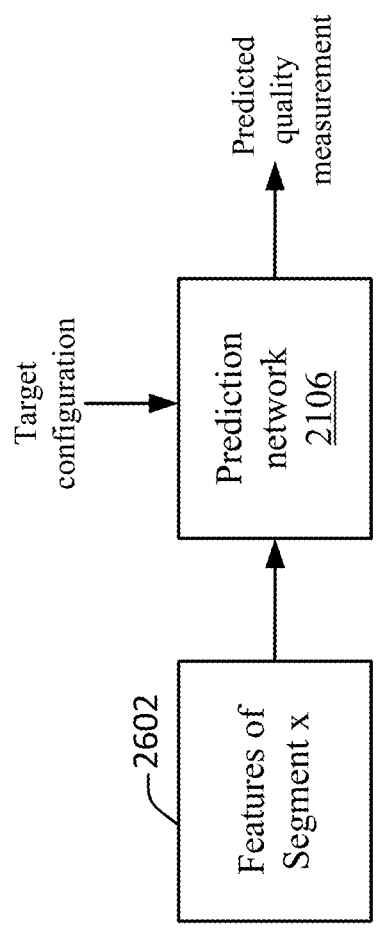
FIG. 26 depicts an example of a direct prediction mode according to some embodiments.

FIG. 26 depicts an example of a direct prediction mode according to some embodiments. At 2602, features of segment x are input into prediction network 2106. Additionally, a target configuration is input into prediction network 2106. The features that are used may include features described in FIG. 22 of computer vision features, spatial domain features, time domain features, frequency domain features and/or proxy encoding features. Prediction network 2106 may be trained to generate predictions based on the feature inputs.

For example, based on values for the features, prediction network 2106 can generate quality values. The proxy encoding features are used as input along with the other features, and prediction network 2106 is trained to output a quality value based on the value of the proxy encoding features and other features. The outputted quality values are for the target configuration. As will be described in more detail below, proxy encoding features may be used differently in the indirect prediction mode by predicting a quality value for a proxy encoding configuration.

Prediction network 2106 outputs a prediction quality value for each bitrate. In some embodiments, the prediction may be performed for each bitrate and resolution pair. The use of proxy encoding features to determine the prediction may improve the quality values. For example, using some actual encoding results may provide better information than just using features that are not based on an actual encoding. The proxy encoding results may have a strong correlation with an accurate prediction of the rate distortion curve. By having a few points from the actual encoding, the generate shape of the rate distortion curve may be provided and the prediction based on those actual points may be improved given the guidance from the actual encoding results. In FIG. 25, there were eight quality values. Prediction network 2106 may be run to generate eight different quality values using eight different bitrates for one resolution.

Indirect Prediction Mode

The indirect prediction mode may predict quality values using a quality offset prediction. A quality offset may be based on a difference between a proxy encoding prediction and a target encoding prediction. The proxy encoding prediction may be a quality value based on proxy encoding configuration. The target encoding prediction may be a target quality value based on a difference between the proxy encoding configuration and a target configuration. For example, the proxy encoding configuration may include a fast setting, but the target configuration may include a regular setting. The process may determine an offset to adjust the proxy encoding prediction based on a difference between the proxy encoding configuration and the target configuration. The target encoding prediction may be the desired quality value for the target configuration similar to the quality value generated in FIG. 26.

Figure 27:
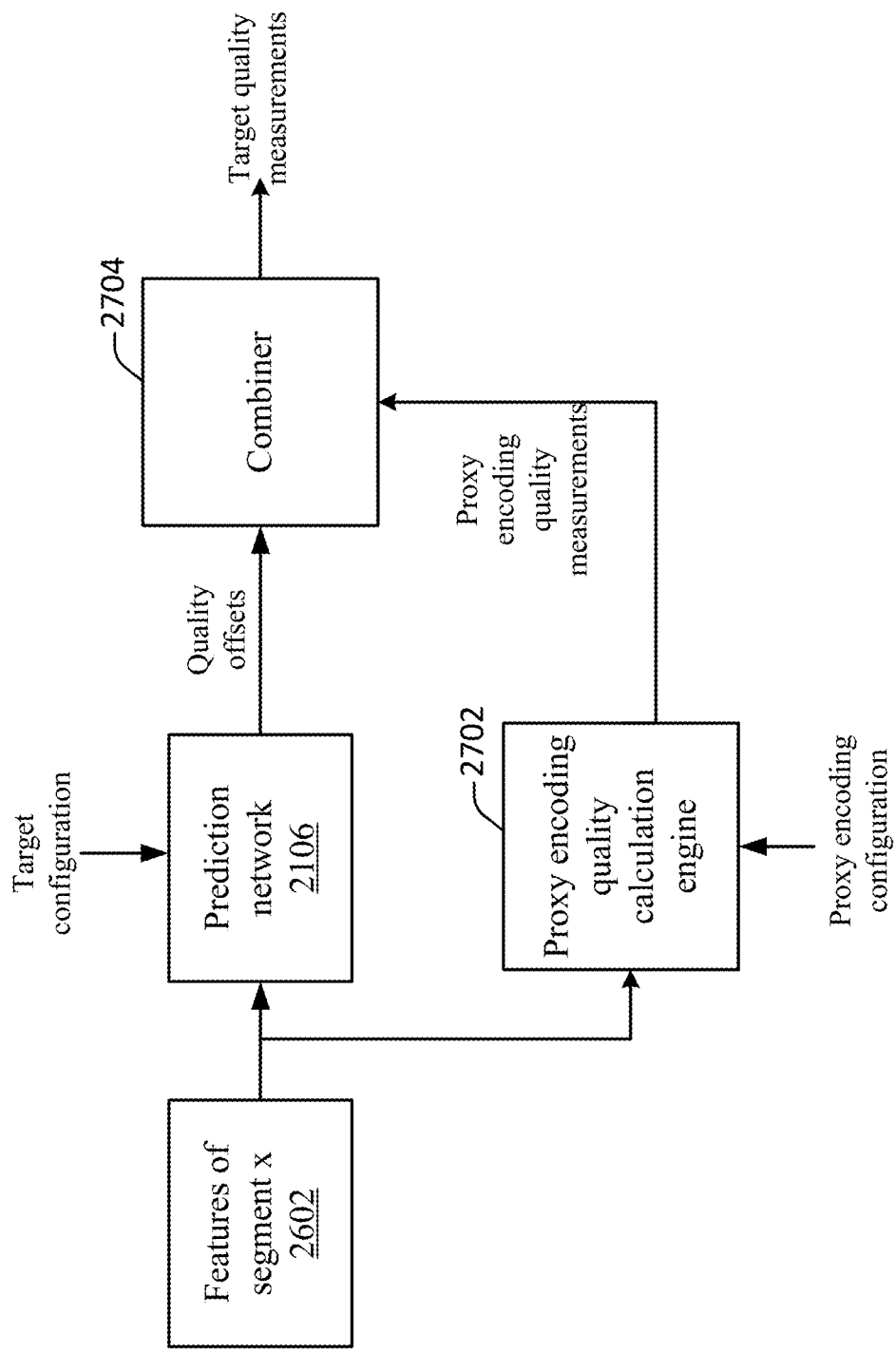
FIG. 27 depicts an example of an indirect prediction mode system according to some embodiments.

FIG. 27 depicts an example of an indirect prediction mode system according to some embodiments. In the indirect prediction mode, two submodules may be used of a prediction network 2106 and a proxy encoding quality calculation engine 2702.

Features of segment x 2602 are received at prediction network 2106 and proxy encoding quality calculation engine 2702. Proxy encoding quality calculation engine 2702 may use a proxy encoding configuration to calculate the proxy quality value based on a current target resolution and a current target bitrate. In some embodiments, an actual encoding of the video may be used to generate the proxy encoding features. The encoder may receive the frames of segment x, encode segment x, and output an encoded bitstream. The proxy encoding features may be determined by the characteristics of the encoded bitstream. Proxy encoding quality calculation engine 2702 may generate proxy quality values at proxy encoding points.

Figure 28:
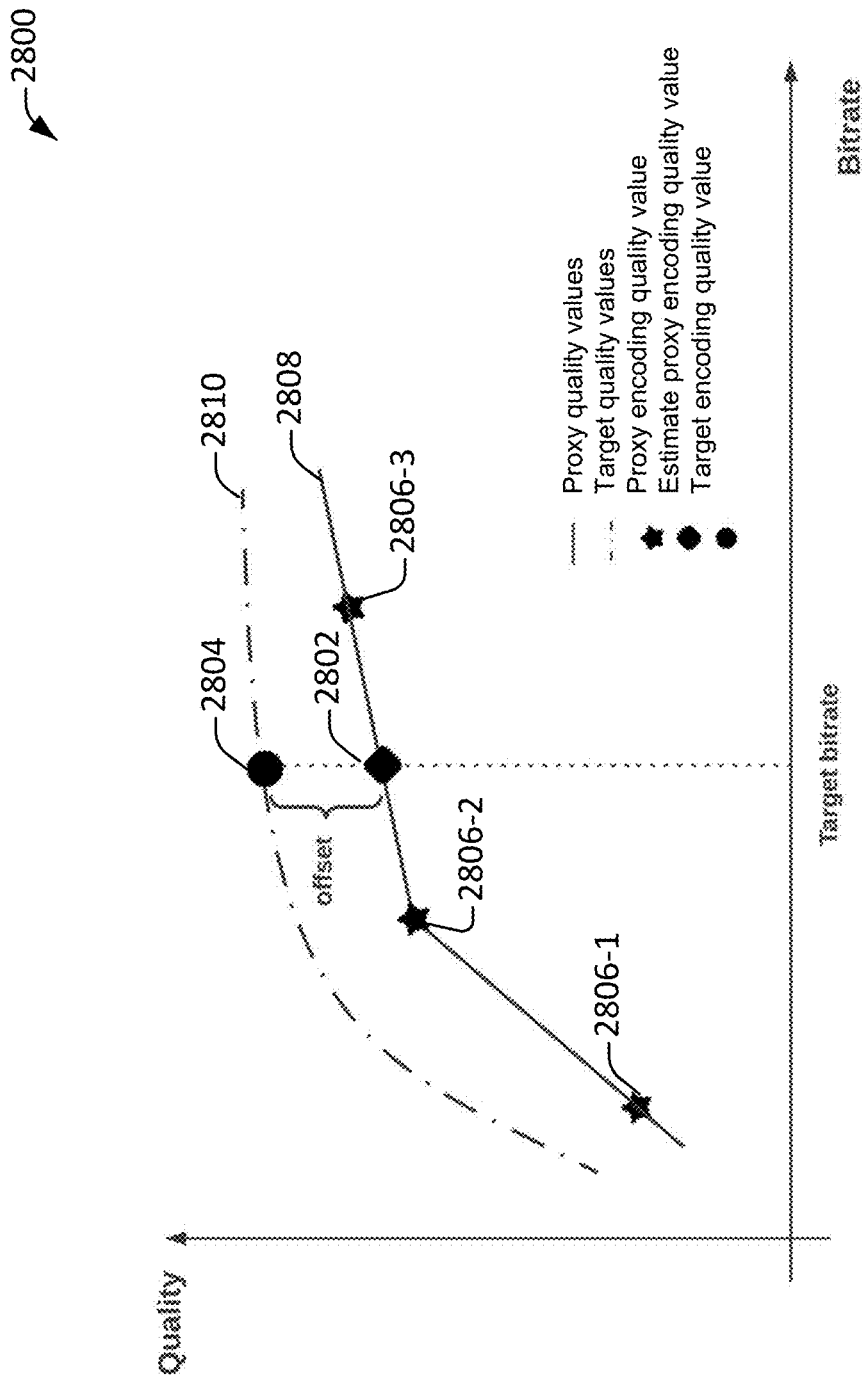
FIG. 28 depicts an example, of proxy encoding results and target encoding results according to some embodiments.

FIG. 28 depicts an example of a graph 2800 of proxy quality values and target quality values according to some embodiments. A line 2808 represents proxy quality values and a line 2810 represents target quality values. Proxy encoding values are at points where quality values are predicted from proxy encoding features and are shown at 2806-1, 2806-2, and 2806-3. The encoder may use settings such as a fast encoding preset to generate the proxy encoding results at proxy encoding points. Then, prediction network 2106 may use features from the proxy encoding to generate corresponding proxy quality values. However, the proxy encoding points may not be enough points to generate the required points for target quality values. Accordingly, proxy encoding quality calculation engine 2702 may generate additional proxy encoding values to produce target encoding values.

To generate additional proxy encoding values, proxy encoding quality calculation engine 2702 may generate estimated proxy encoding values at other bitrates. For example, an estimated proxy quality value 2802 is generated based on actual proxy quality values. In some examples, an interpolation or a fitting algorithm may estimate the estimated proxy quality value at 2802 for another bitrate. As shown, estimated proxy quality value 2802 may use the values of proxy quality values 2806-2 and 2806-3 to determine the value of estimated proxy quality value 2802, such as by estimating the value of estimated proxy quality value 2802 at a bitrate between proxy quality value 2806-2 and 2806-3. Calculation engine 2702 may generate other proxy quality values similarly. Proxy encoding quality calculation engine 2702 outputs the proxy encoding point quality values to a combiner 2704.

Also, in addition to the proxy encoding quality calculation, prediction network 2106 is configured to generate a quality offset for bitrates. For example, prediction network 2106 may be trained to determine a quality offset based on the inputted features for the segment. The quality offset may be a prediction of a difference between the target configuration and the proxy encoding configuration. For example, the quality offset may estimate a difference between the proxy quality value and the target quality value that is estimated based on a difference between the proxy encoding configuration and the target configuration. The prediction network may be trained differently to predict the offset instead of the target quality value.

In FIG. 28, prediction network 2106 may predict the offset, which is a difference between a point 2802 and the target encoding point. For example, prediction network 2106 may predict an offset of a quality value for the target bitrate that is associated with a proxy quality value at 2802. Then, prediction network 2106 outputs the offset for each bitrate that is associated with a proxy quality value to combiner 2704.

Combiner 2704 may combine the proxy quality values and the quality offsets. For example, for each proxy quality value, a respective quality offset may be received. Combiner 2704 may then combine the quality offset with the associated proxy quality value to generate a target quality value as shown at 2804 in FIG. 28. In some embodiments, combiner 2704 may add the quality offset to the respective proxy quality value to generate the target quality value. Other methods of combining the offset may also be appreciated, such as using the offset as a multiplier, subtracting the offset, etc. Combiner 2704 then outputs the target quality values for the target configuration. The above process may be run for each target configuration to generate target quality values.

The direct prediction mode and the indirect prediction mode may be alternatively run, such as only one of the modes is run to generate quality values. For example, the indirect mode may be determined to be more accurate when certain characteristics of videos maybe encountered and the direct mode may be more accurate when certain characteristics are encountered. In some examples, the direct mode may be more accurate when simple content is being encoded, such as cartoons. However, when a movie is being encoded with more complicated content, the indirect mode may be more accurate. The indirect mode may be more accurate because the proxy encoding may use an actual encoding to generate the quality values. Then, the prediction of the target quality values may be based on some quality values from an actual encoding where a straight prediction of the quality values may be harder due to the complexity of the content.

Figure 29:
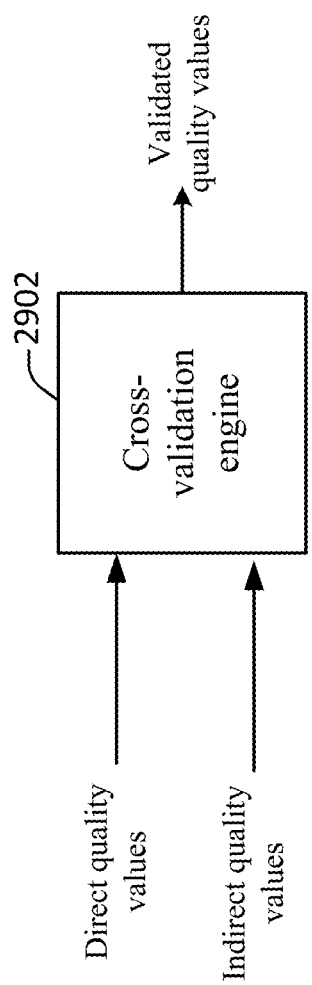
FIG. 29 depicts an example of using direct quality values and indirect quality values according to some embodiments.

In other embodiments, the direct prediction quality values and the indirect prediction quality values may be used in combination. FIG. 29 depicts an example of using direct quality values and indirect quality values according to some embodiments. In some embodiments, a cross validation engine 2902 may use the direct quality values and the indirect quality values to output validated quality values. A validated quality value may be based on a combination of a direct quality value and an indirect quality value for a bitrate. For example, an average of the two values may be used. In other embodiments, cross-validation engine 2902 may select one of the direct quality value or the indirect quality value to output. For example, a direct prediction measurement may be selected or an indirect prediction measurement may be selected.

In other examples, cross-validation engine 2902 may validate the measurements, such as comparing a direct quality value and an indirect quality value for a bitrate. If the difference between the direct quality value and the indirect quality value meets a threshold, such as are within a threshold of each other, then cross-validation engine 2902 may validate the quality values. If not, cross-validation engine 2902 may not validate the quality values and may output an error. Also, cross-validation engine 2902 may merge direct mode results and indirect mode results based on bitrate range. For example, cross-validation engine 2902 could use the direct mode to predict quality values in a lower bitrate range and use the indirect mode to predict quality values in a higher bitrate range because different prediction modes may have different advantages in different bitrate ranges. Additionally, cross-validation engine 2902 could use a maximum value or minimum value when merging the values together, such as when averaging the values.

RD Map

After the generation of the target quality values for multiple resolutions and bitrates, RD map generator 2108 generates an RD map. RD map generator 2108 may use a fitting or interpolation method to link the quality values that have been generated. RD map generator 2108 may generate rate distortion curves for the different resolutions.

Figure 30A:
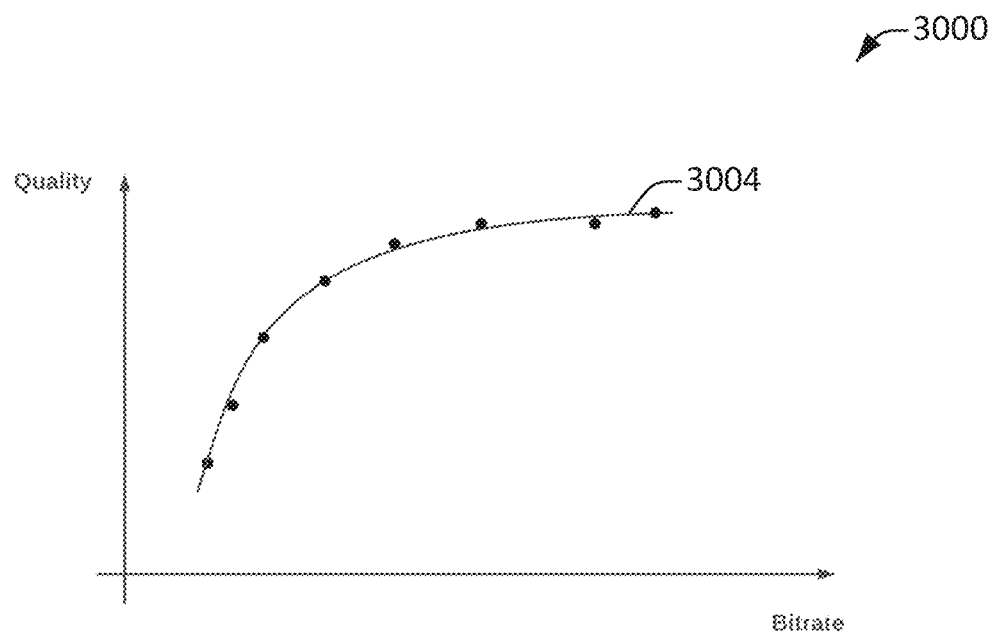
FIG. 30A depicts a graph of a rate distortion curve for a single resolution according to some embodiments.

FIG. 30A depicts a graph 3000 of a rate distortion curve for a single resolution according to some embodiments. The points for the quality value are shown and RD map generator 2108 uses a method to link the points as a curve 3004. Different fitting or interpolation methods may be used to draw the curve based on the quality values.

Figure 30B:
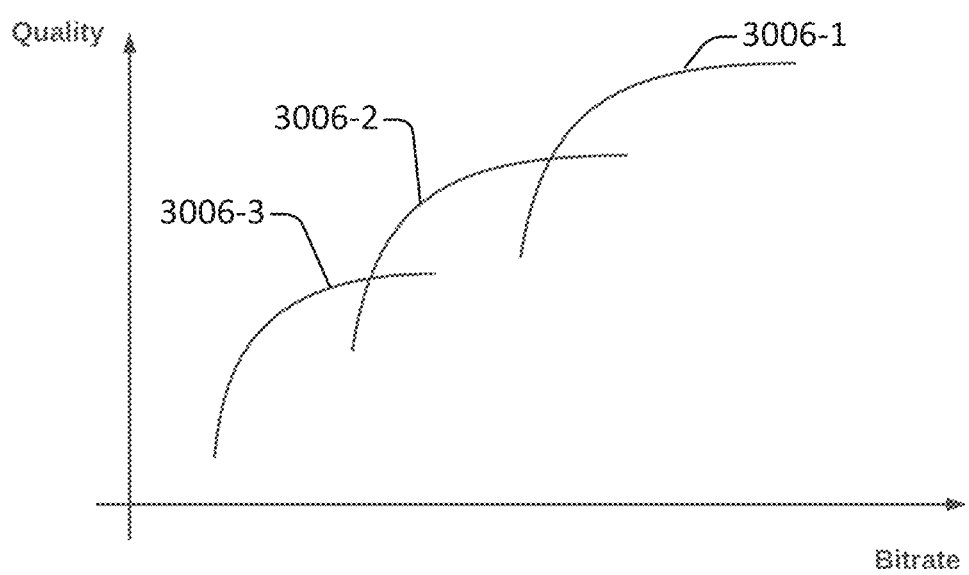
FIG. 30B shows a graph that shows a RD map according to some embodiments.

FIG. 30B shows a graph 3002 that shows a RD map according to some embodiments. The RD map may include a rate distortion curve for three resolutions of 1920×1080, 1280×720, and 640×360 at 306-1, 306-2, and 306-3, respectively.

Conclusion

Accordingly, rate distortion curves and a rate distortion map may be predicted without actually encoding each rate distortion curve using the target configuration. This saves computing resources and time. Also, the rate distortion curves may be predicted more accurately using the direct mode and the indirect mode.

System

Figure 31:
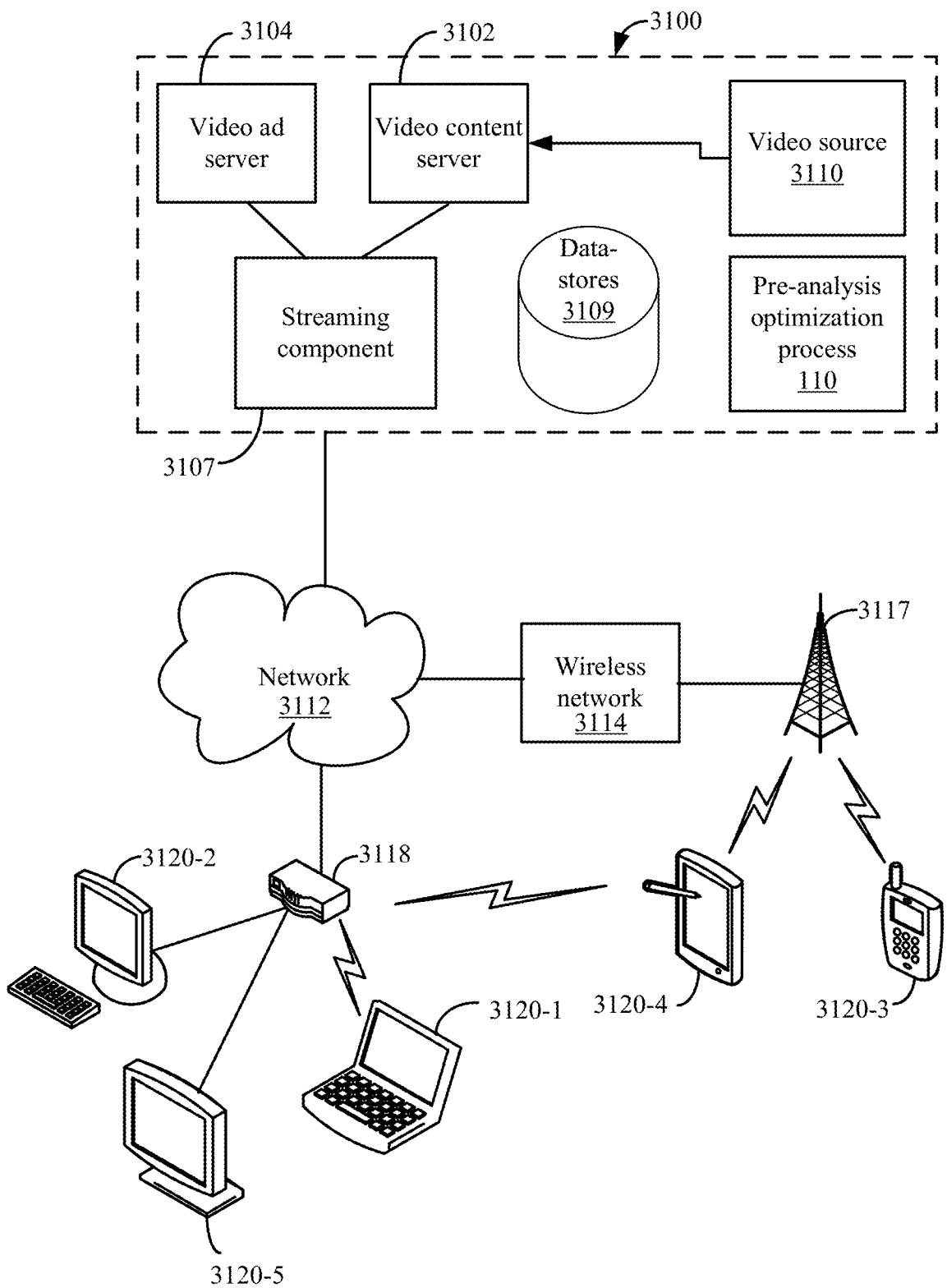
FIG. 31 depicts a video streaming system in communication with multiple client devices via one or more communication networks according to one embodiment.

Features and aspects as disclosed herein may be implemented in conjunction with a video streaming system 3100 in communication with multiple client devices via one or more communication networks as shown in FIG. 31. Aspects of the video streaming system 3100 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 3100, video data may be obtained from one or more sources for example, from a video source 3110, for use as input to a video content server 3102. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 3100 may include one or more computer servers or modules 3102, 3104, and 3107 distributed over one or more computers. Each server 3102, 3104, 3107 may include, or may be operatively coupled to, one or more data stores 3109, for example databases, indexes, files, or other data structures. A video content server 3102 may access a data store (not shown) of various video segments. The video content server 3102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 3104 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 3100, a public service message, or some other information. The video advertising server 3104 may serve the video advertising segments as directed by a user interface controller (not shown).

The video streaming system 3100 also may include pre-analysis optimization process 110.

The video streaming system 3100 may further include an integration and streaming component 3107 that integrates video content and video advertising into a streaming video segment. For example, streaming component 3107 may be a content server or streaming media server. A controller (not shown) may determine the selection or configuration of advertising in the streaming video based on any suitable algorithm or process. The video streaming system 3100 may include other modules or units not depicted in FIG. 31, for example, administrative servers, commerce servers, network infrastructure, advertising selection engines, and so forth.

The video streaming system 3100 may connect to a data communication network 3112. A data communication network 3112 may comprise a local area network (LAN), a wide area network (WAN), for example, the Internet, a telephone network, a wireless network 3114 (e.g., a wireless cellular telecommunications network (WCS)), or some combination of these or similar networks.

One or more client devices 3120 may be in communication with the video streaming system 3100, via the data communication network 3112, wireless network 3114, or another network. Such client devices may include, for example, one or more laptop computers 3120-1, desktop computers 3120-2, "smart" mobile phones 3120-3, tablet devices 3120-4, network-enabled televisions 3120-5, or combinations thereof, via a router 3118 for a LAN, via a base station 3117 for wireless network 3114, or via some other connection. In operation, such client devices 3120 may send and receive data or instructions to the system 3100, in response to user input received from user input devices or other input. In response, the system 3100 may serve video segments and metadata from the data store 3109 responsive to selection of media programs to the client devices 3120. Client devices 3120 may output the video content from the streaming video segment in a media player using a display screen, projector, or other video output device, and receive user input for interacting with the video content.

Distribution of audio-video data may be implemented from streaming component 3107 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 3107 may communicate with client device 3120 using control messages and data messages to adjust to changing network conditions as the video is played. These control messages can include commands for enabling control functions such as fast forward, fast reverse, pausing, or seeking to a particular part of the file at the client.

Since streaming component 3107 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 3107 may use TCP-based protocols, such as HyperText Transfer Protocol (HTTP) and Real Time Messaging Protocol (RTMP). Streaming component 3107 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 32:
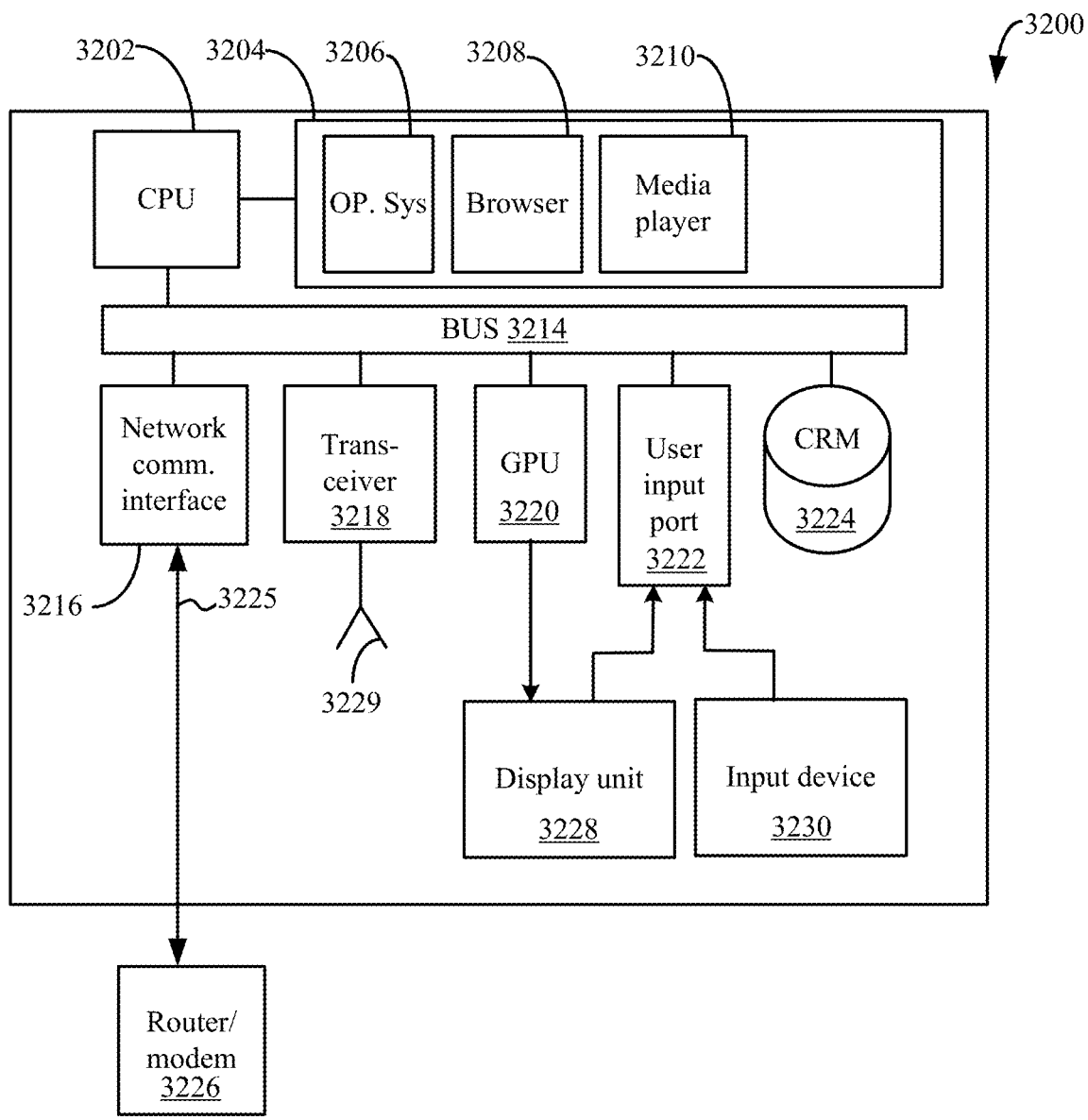
FIG. 32 depicts a diagrammatic view of an apparatus for viewing video content and advertisements.

Referring to FIG. 32, a diagrammatic view of an apparatus 3200 for viewing video content and advertisements is illustrated. In selected embodiments, the apparatus 3200 may include a processor (CPU) 3202 operatively coupled to a processor memory 3204, which holds binary-coded functional modules for execution by the processor 3202. Such functional modules may include an operating system 3206 for handling system functions such as input/output and memory access, a browser 3208 to display web pages, and media player 3210 for playing video. The memory 3204 may hold additional modules not shown in FIG. 32, for example modules for performing other operations described elsewhere herein.

A bus 3214 or other communication component may support communication of information within the apparatus 3200. The processor 3202 may be a specialized or dedicated microprocessor configured or operable to perform particular tasks in accordance with the features and aspects disclosed herein by executing machine-readable software code defining the particular tasks. Processor memory 3204 (e.g., random access memory (RAM) or other dynamic storage device) may be connected to the bus 3214 or directly to the processor 3202, and store information and instructions to be executed by a processor 3202. The memory 3204 may also store temporary variables or other intermediate information during execution of such instructions.

A computer-readable medium in a storage device 3224 may be connected to the bus 3214 and store static information and instructions for the processor 3202; for example, the storage device (CRM) 3224 may store the modules for operating system 3206, browser 3208, and media player 3210 when the apparatus 3200 is powered off, from which the modules may be loaded into the processor memory 3204 when the apparatus 3200 is powered up. The storage device 3224 may include a non-transitory computer-readable storage medium holding information, instructions, or some combination thereof, for example instructions that when executed by the processor 3202, cause the apparatus 3200 to be configured or operable to perform one or more operations of a method as described herein.

A network communication (comm.) interface 3216 may also be connected to the bus 3214. The network communication interface 3216 may provide or support two-way data communication between the apparatus 3200 and one or more external devices, e.g., the streaming system 3100, optionally via a router/modem 3226 and a wired or wireless connection 3225. In the alternative, or in addition, the apparatus 3200 may include a transceiver 3218 connected to an antenna 3229, through which the apparatus 3200 may communicate wirelessly with a base station for a wireless communication system or with the router/modem 3226. In the alternative, the apparatus 3200 may communicate with a video streaming system 3100 via a local area network, virtual private network, or other network. In another alternative, the apparatus 3200 may be incorporated as a module or component of the system 3100 and communicate with other components via the bus 3214 or by some other modality.

The apparatus 3200 may be connected (e.g., via the bus 3214 and graphics processing unit 3220) to a display unit 3228. A display 3228 may include any suitable configuration for displaying information to an operator of the apparatus 3200. For example, a display 3228 may include or utilize a liquid crystal display (LCD), touchscreen LCD (e.g., capacitive display), light emitting diode (LED) display, projector, or other display device to present information to a user of the apparatus 3200 in a visual display.

One or more input devices 3230 (e.g., an alphanumeric keyboard, microphone, keypad, remote controller, game controller, camera, or camera array) may be connected to the bus 3214 via a user input port 3222 to communicate information and commands to the apparatus 3200. In selected embodiments, an input device 3230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 3228, for example using a touch sensitive screen. A cursor control device may communicate direction information and command selections to the processor 3202 and control cursor movement on the display 3228. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
    determining, by a computing device, feature values for a portion of a video and a target configuration, wherein the target configuration includes a set of bitrates and a resolution, and a parameter of an encoder that is a setting of the encoder that the encoder uses to encode the portion of video in the set of bitrates and the resolution;
    inputting, by the computing device, the feature values and the target configuration into a prediction network to generate a plurality of quality values for the set of bitrates and the resolution;
    generating, by the computing device, a representation of a relationship between bitrate and the plurality of quality values for the resolution;
    analyzing, by the computing device, the representation to determine a list of bitrates for the portion of the video; and
    outputting, by the computing device, the list of bitrates for use encoding the portion of the video using the resolution.

2. The method of claim 1, wherein the parameter of the encoder comprises an encoding configuration or encoding setting for encoding the portion of video.

3. The method of claim 1, wherein:
    for each bitrate in the set of bitrates, a quality value for the resolution is generated.

4. The method of claim 1, wherein the resolution comprises a plurality of resolutions, and wherein generating the plurality of quality values comprises:
    selecting a resolution in the plurality of resolutions;
    for each bitrate in the set of bitrates, generating a quality value for the resolution; and continuing to select a new resolution in the plurality of resolutions and generating the quality value for each bitrate in the set of bitrates for the new resolution until all resolutions in the plurality of resolutions are processed.

5. The method of claim 1, wherein the representation of the relationship between bitrate and the plurality of quality values comprises a rate distortion curve.

6. The method of claim 1, further comprising:
generating a plurality of quality values for the set of bitrates for a plurality of resolutions; and
generating a plurality of representations of the relationship between bitrate and the plurality of quality values for the plurality of resolutions.

7. The method of claim 6, further comprising:
generating a map that includes the plurality of representations for the plurality of resolutions; and
using the map to determine the list of bitrates.

8. The method of claim 1, wherein the feature values comprise one or more of computer vision features, spatial domain features, time domain features, frequency domain features, and proxy encoding features.

9. The method of claim 8, wherein the proxy encoding features are based on an actual encoding of the video, wherein a setting in the actual encoding is different from the parameter in the target configuration.

10. The method of claim 1, wherein inputting the feature values into the prediction network comprises:
determining proxy encoding feature values from an actual encoding of the video; and
inputting the proxy encoding feature values into the prediction network to generate a plurality of proxy quality values.

11. The method of claim 10, wherein:
quality values in the plurality of quality values are generated based on the plurality of proxy quality values.

12. The method of claim 11, wherein quality values in the plurality of quality values are generated based on the plurality of proxy quality values by:
generating a plurality of offset values using a prediction network, wherein the plurality of offset values is based on a difference between a setting in the actual encoding from the parameter in the target configuration; and
using the plurality of offset values and the plurality of proxy quality values to generate the plurality of quality values.

13. The method of claim 1, wherein quality values in the plurality of quality values are generated by:
determining a first plurality of quality values using a first prediction method;
determining a second plurality of quality values using a second prediction method, wherein the second prediction method predicts an offset to proxy quality values that are determined based on a difference between a setting in an actual encoding from the parameter in the target configuration; and
comparing the first plurality of quality values and the second plurality of quality values to determine the plurality of quality values.

14. The method of claim 1, wherein quality values in the plurality of quality values are generated by:
analyzing a characteristic of the portion of the video;
selecting one of a first prediction method and a second prediction method based on the characteristic, wherein the second prediction method predicts an offset to proxy quality values that are determined based on a difference between a setting in an actual encoding from the parameter in the target configuration; and
using the selected one of the first prediction method and the second prediction method to determine the plurality of quality values.

15. The method of claim 1, wherein the target configuration comprises a first target configuration, the method further comprising:
determining a second target configuration that is associated with another value for the parameter of the encoder;
inputting the feature values and the second target configuration into the prediction network to generate another plurality of quality values for the set of bitrates and the resolution; and
outputting another list of bitrates for use encoding the portion of the video using the resolution for the second target configuration.

16. A non-transitory computer-readable storage medium having stored thereon computer executable instructions, which when executed by a computing device, cause the computing device to be operable for:
determining feature values for a portion of a video and a target configuration, wherein the target configuration includes a set of bitrates and a resolution, and a parameter of an encoder that is a setting of the encoder that the encoder uses to encode the portion of video in the set of bitrates and the resolution;
inputting the feature values and the target configuration into a prediction network to generate a plurality of quality values for the set of bitrates and the resolution;
generating a representation of a relationship between bitrate and the plurality of quality values for the resolution;
analyzing the representation to determine a list of bitrates for the portion of the video; and
outputting the list of bitrates for use encoding the portion of the video using the resolution.

17. A method comprising:
determining, by a computing device, proxy encoding feature values from an actual encoding of a portion of a video using a proxy encoding configuration, wherein the proxy encoding configuration includes a set of bitrates and a resolution, and a first parameter of an encoder that is a setting of the encoder that the encoder uses to encode the portion of video in the set of bitrates and a resolution;
inputting, by the computing device, the proxy encoding feature values and the proxy encoding configuration into a first prediction network to generate a plurality of proxy quality values for the set of bitrates and the resolution based on a first prediction method;
determining, by the computing device, target feature values for the portion of the video and a target configuration, wherein the target configuration includes the set of bitrates and the resolution, and a second parameter of the encoder that is the setting of the encoder that the encoder uses to encode the portion of video in the set of bitrates and the resolution;
inputting, by the computing device, the target feature values into a second prediction network to generate a plurality of offset quality values for the set of bitrates and the resolution based on a second prediction method, wherein the second prediction method predicts an offset to proxy quality values that is determined based on a difference between the first parameter and the second parameter; and generating, by the computing device, a plurality of quality values using the plurality of proxy quality values and the plurality of quality offset values.

18. The method of claim 17, wherein the plurality of quality values comprises a first plurality of quality values, the method further comprising:
    determining a second plurality of quality values using a third prediction method that predicts quality values based on the target configuration; and
    comparing the first plurality of quality values and the second plurality of quality values to determine quality values to output for the set of bitrates and the resolution.

19. The method of claim 18, wherein comparing the first plurality of quality values and the second plurality of quality values to determine quality values to output comprises:
    analyzing a characteristic of the portion of video; and
    selecting one of the first plurality of quality values and the second plurality of quality values based on the characteristic.

20. The method of claim 19, wherein comparing the first plurality of quality values and the second plurality of quality values to determine quality values to output comprises:
    combining the first plurality of quality values and the second plurality of quality values based on the characteristic.

* * * * *